(12) United States Patent
Ishikawa et al.

(10) Patent No.: US 9,541,821 B2
(45) Date of Patent: Jan. 10, 2017

(54) LIGHT SOURCE HOUSING, LIGHT SOURCE DEVICE, AND IMAGE PROJECTION APPARATUS

(71) Applicants: Naoyuki Ishikawa, Kanagawa (JP); Tetsuya Fujioka, Kanagawa (JP); Hideo Kanai, Tokyo (JP); Akihisa Mikawa, Kanagawa (JP); Masamichi Yamada, Kanagawa (JP); Yasunari Mikutsu, Tokyo (JP); Satoshi Tsuchiya, Kanagawa (JP); Yukimi Nishi, Tokyo (JP)

(72) Inventors: Naoyuki Ishikawa, Kanagawa (JP); Tetsuya Fujioka, Kanagawa (JP); Hideo Kanai, Tokyo (JP); Akihisa Mikawa, Kanagawa (JP); Masamichi Yamada, Kanagawa (JP); Yasunari Mikutsu, Tokyo (JP); Satoshi Tsuchiya, Kanagawa (JP); Yukimi Nishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 51 days.

(21) Appl. No.: 14/631,966

(22) Filed: Feb. 26, 2015

(65) Prior Publication Data

US 2015/0241047 A1    Aug. 27, 2015

(30) Foreign Application Priority Data

Feb. 27, 2014    (JP) ................. 2014-037503

(51) Int. Cl.
*G03B 21/16*    (2006.01)
*G03B 21/20*    (2006.01)
(Continued)

(52) U.S. Cl.
CPC ............ *G03B 21/2066* (2013.01); *F21V 7/00* (2013.01); *F21V 29/60* (2015.01); *G03B 21/16* (2013.01); *G03B 21/2026* (2013.01)

(58) Field of Classification Search
CPC ............ F21V 29/60; F21V 7/00; G03B 21/16; G03B 21/2066; G03B 21/2026
See application file for complete search history.

(56) References Cited

U.S. PATENT DOCUMENTS 8,511,834 B2    8/2013    Kobayashi et al.
2010/0026966 A1*    2/2010    Nakano ................. G03B 21/16
                                                              353/61

(Continued)

FOREIGN PATENT DOCUMENTS

JP    2011-048210         3/2011
JP    2011-203515         10/2011
JP    2011203515 A  *  10/2011  ............. G03B 21/16

*Primary Examiner* — Sultan Chowdhury
*Assistant Examiner* — Magda Cruz
(74) *Attorney, Agent, or Firm* — IPUSA, PLLC

(57) ABSTRACT

A light source housing to which a light source lamp having a light emission tube and a reflector is attached includes a pair of flow paths bifurcating onto upper and lower sides of the light emission tube from an air intake port for introducing a cooling air; a flow path open and close unit that slides in a direction of the gravitational force so as to open the flow path on the upper side of the light emission tube and close the flow path on the lower side of the light emission tube; and an air outtake port that outtakes the cooling air introduced into the reflector from the flow path on the upper side of the light emission tube to an outside of the reflector.

11 Claims, 22 Drawing Sheets

(51) Int. Cl.
 *F21V 29/60* (2015.01)
 *F21V 7/00* (2006.01)

(56) References Cited

U.S. PATENT DOCUMENTS

2010/0103382 A1* 4/2010 Onodera ................ G03B 21/16
 353/52
2012/0019790 A1* 1/2012 Nagarekawa .......... G03B 21/16
 353/98

* cited by examiner

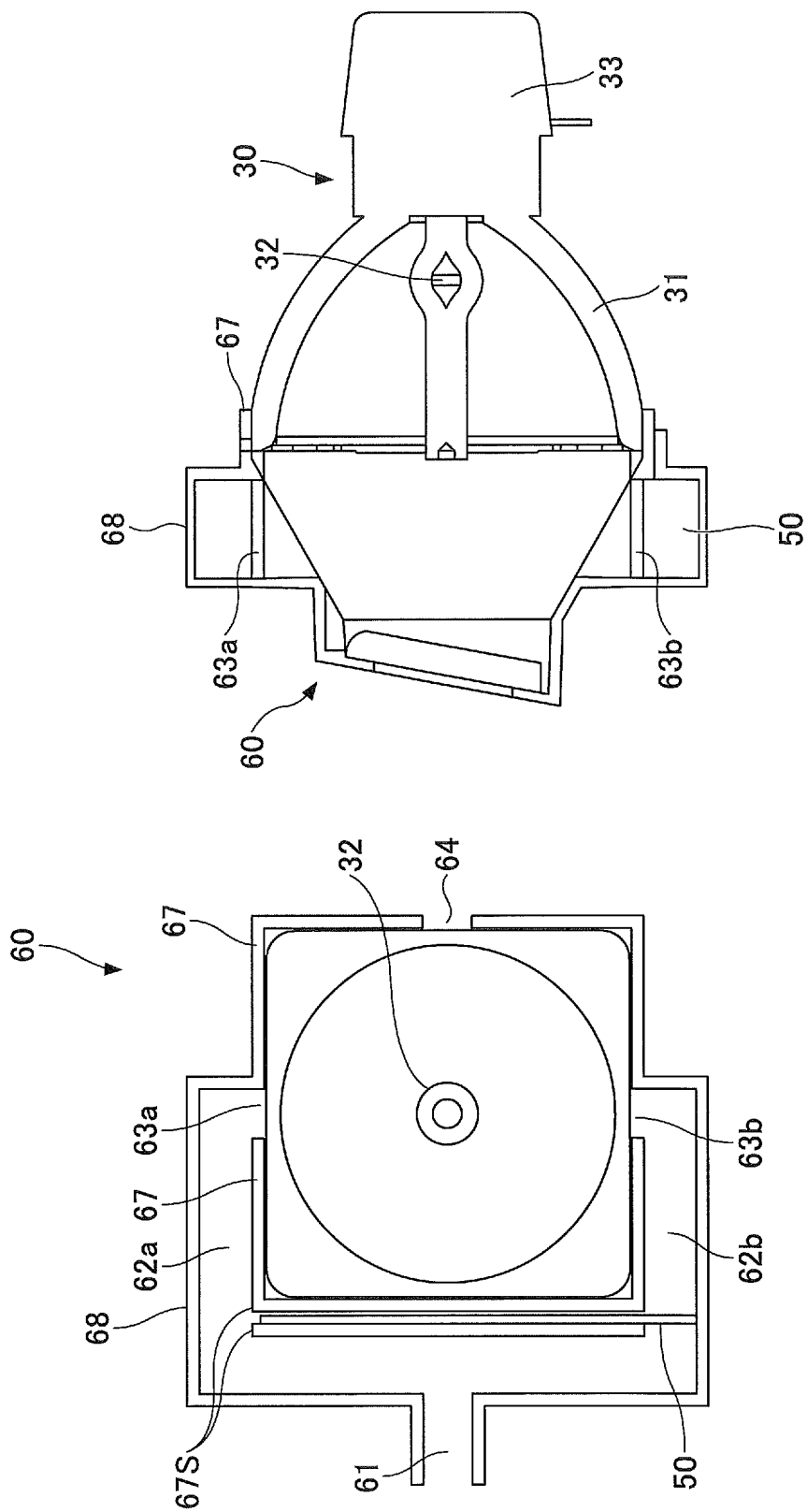

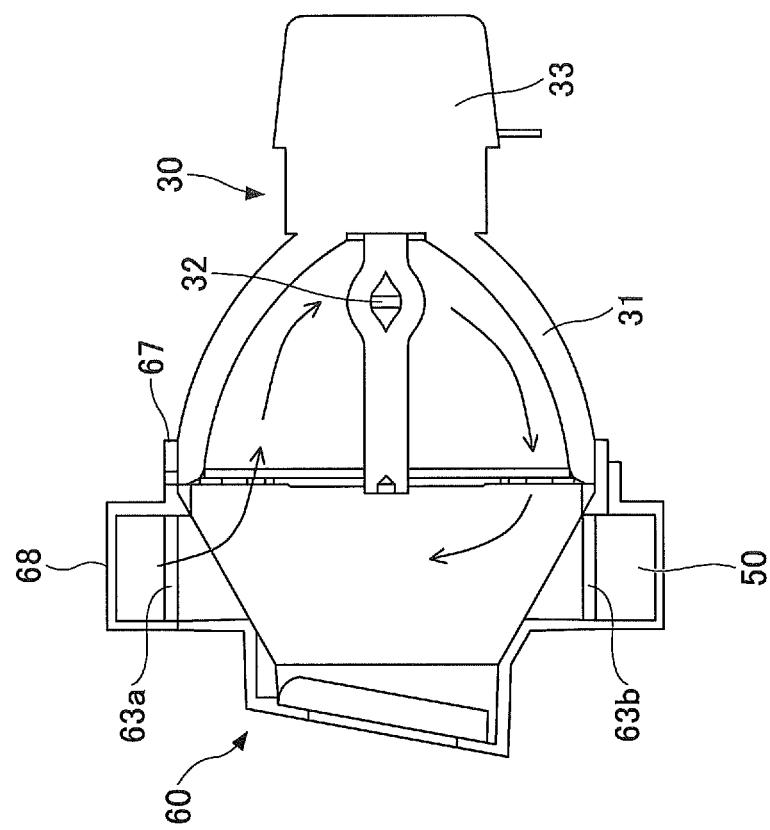
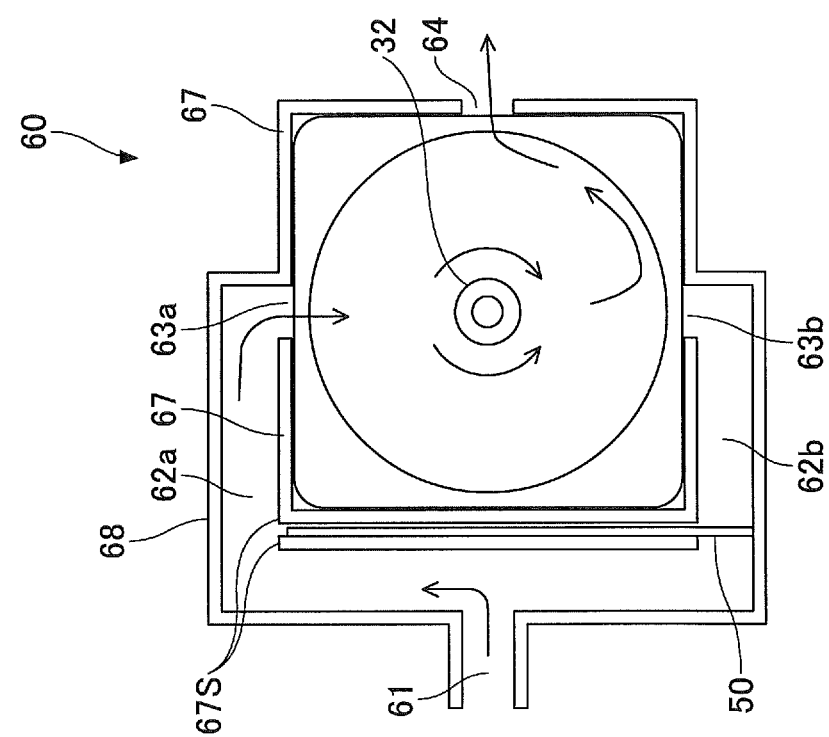

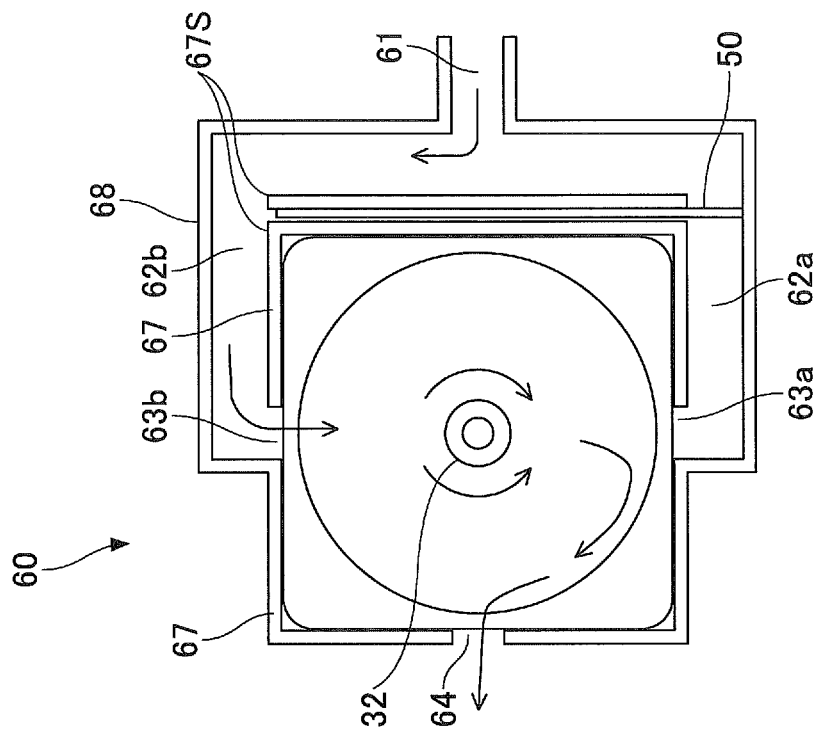
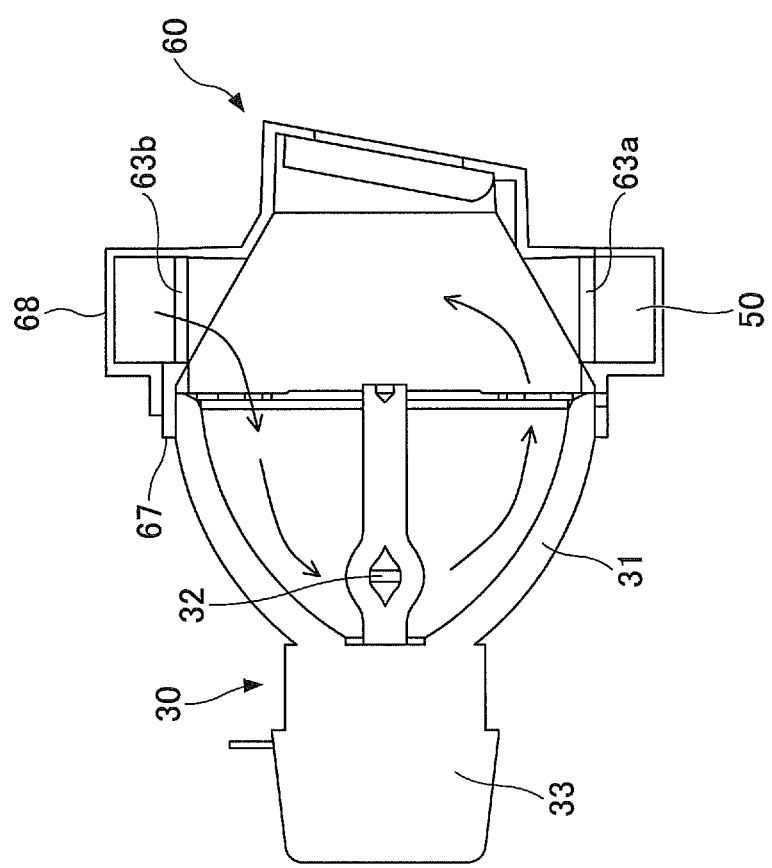

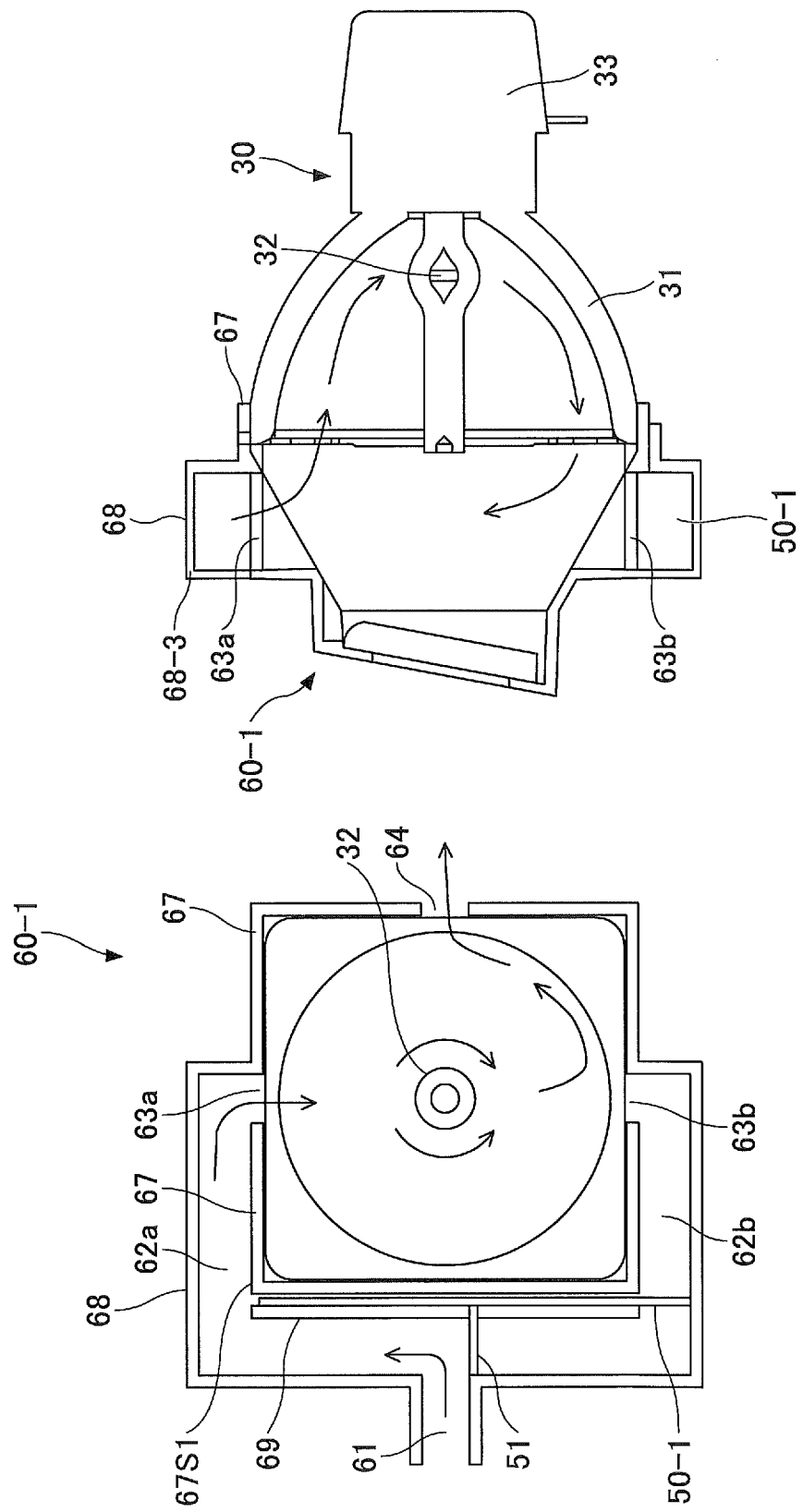

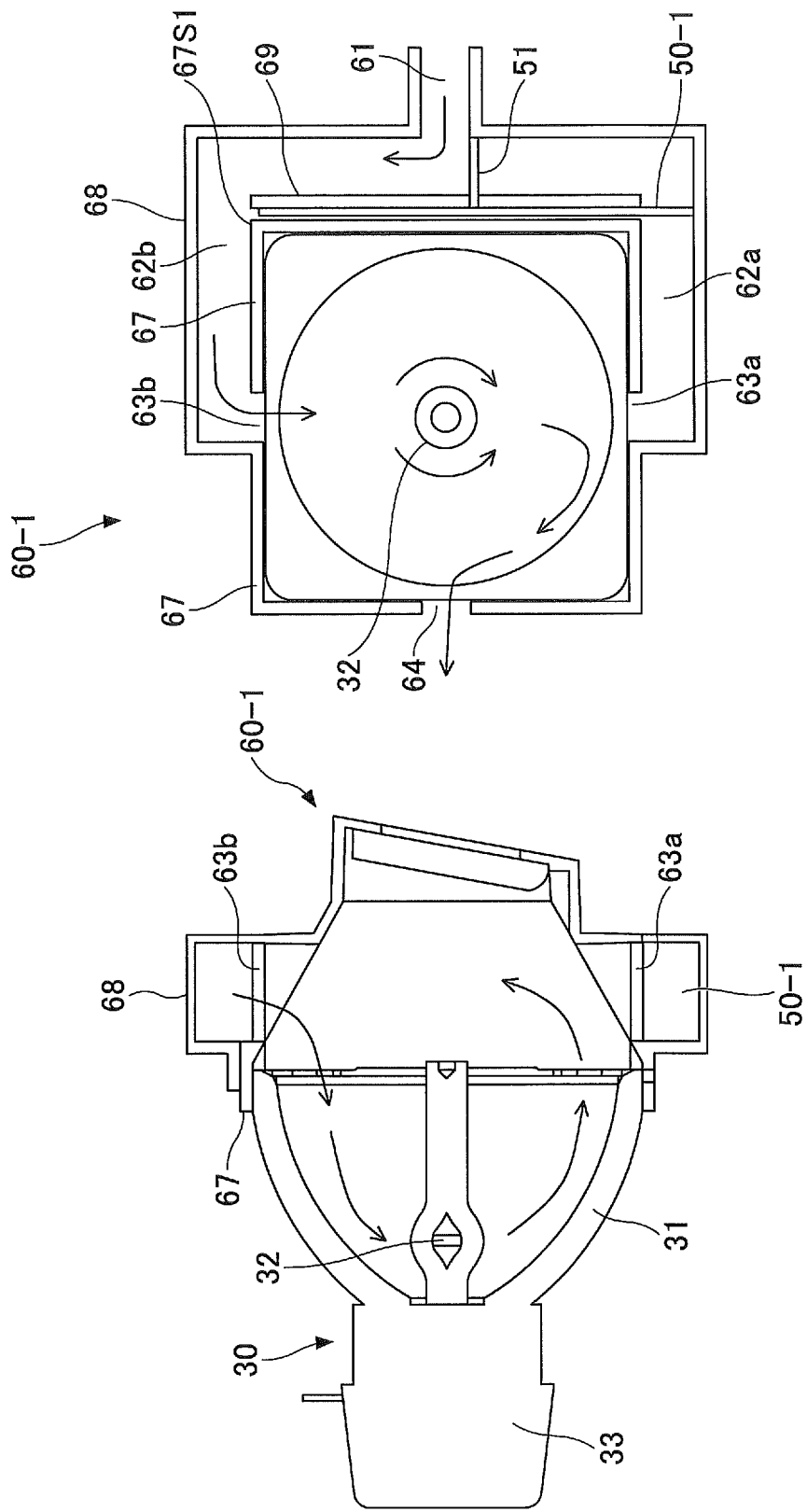

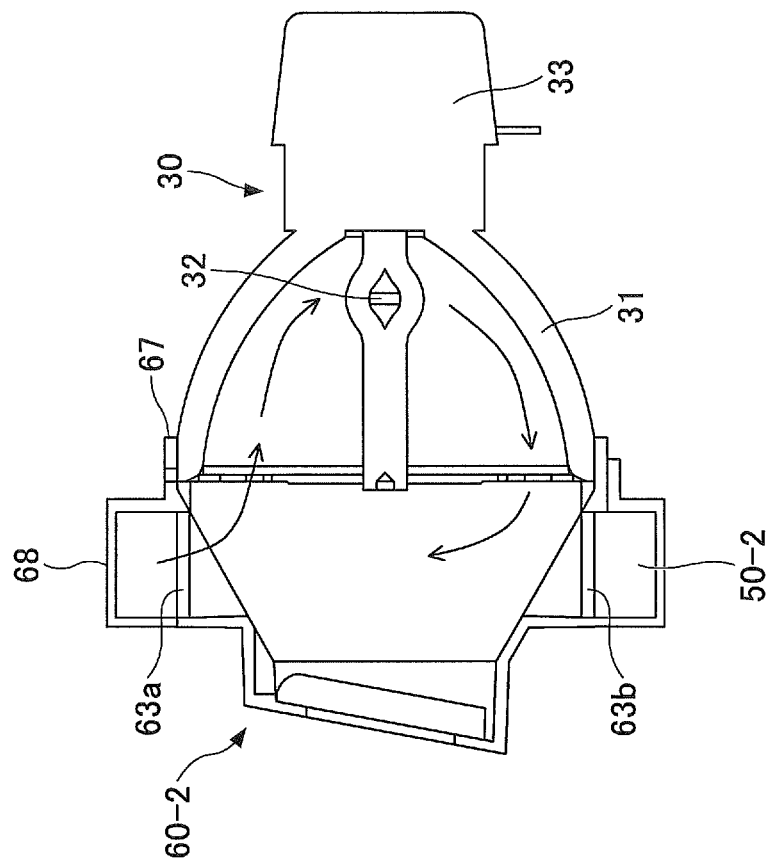
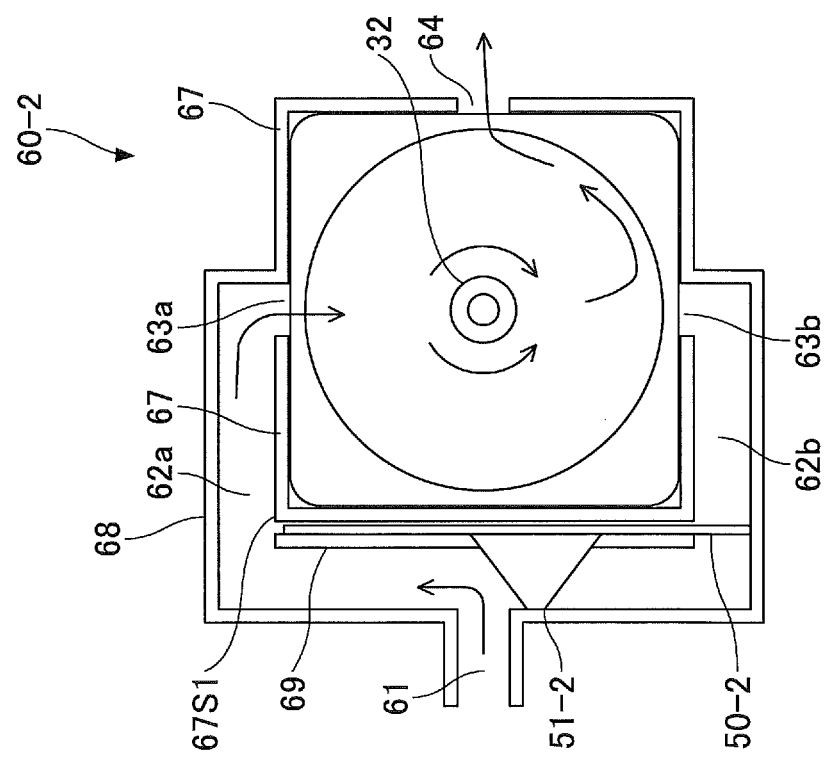
FIG.20A
FIG.20B

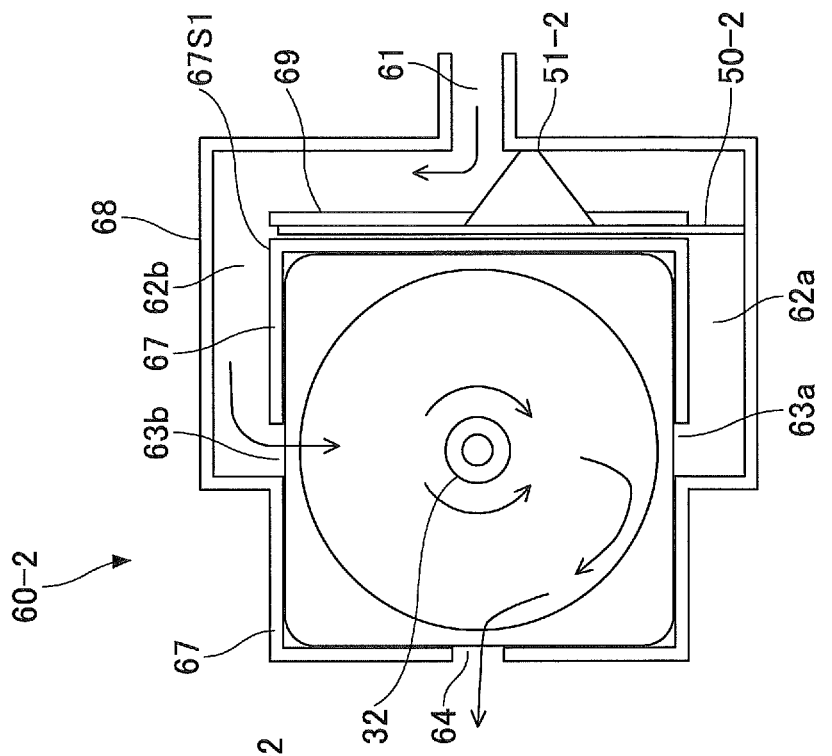
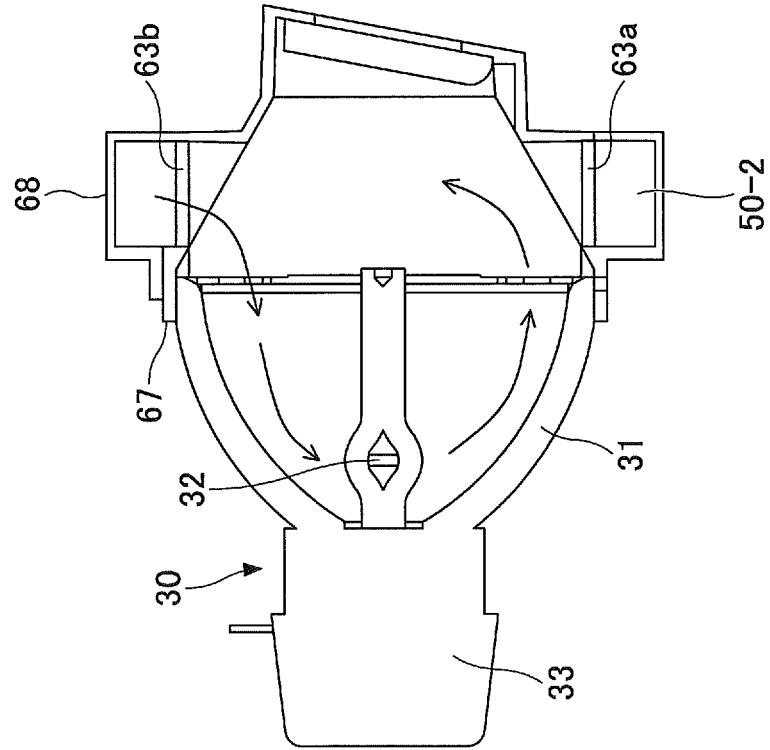

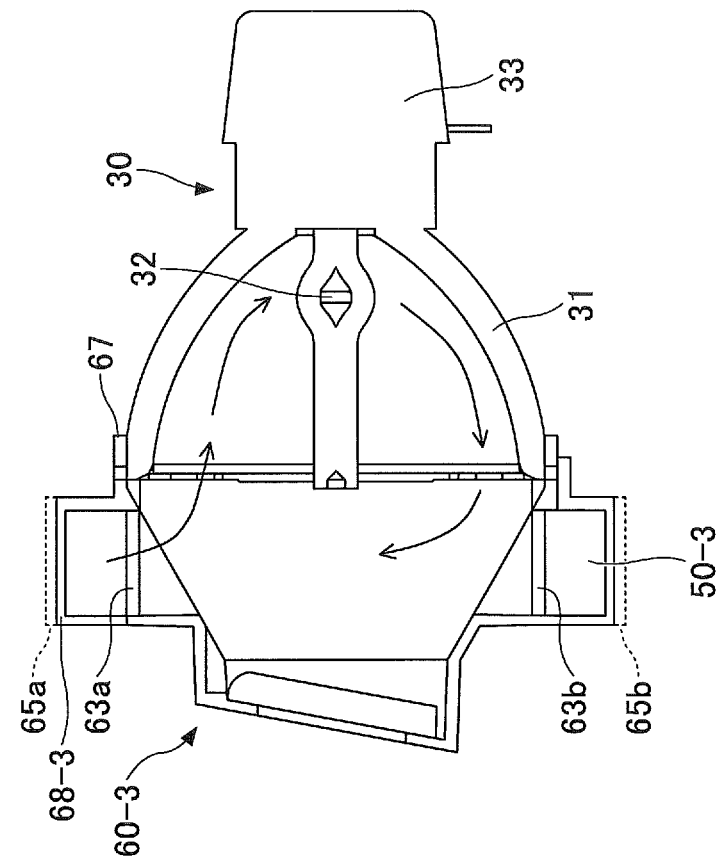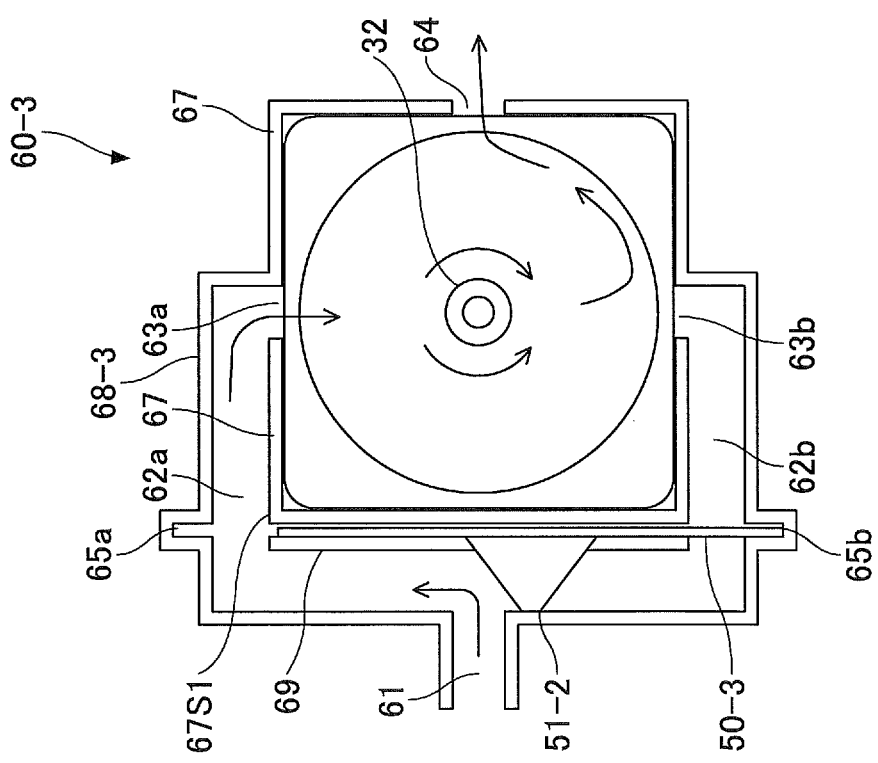

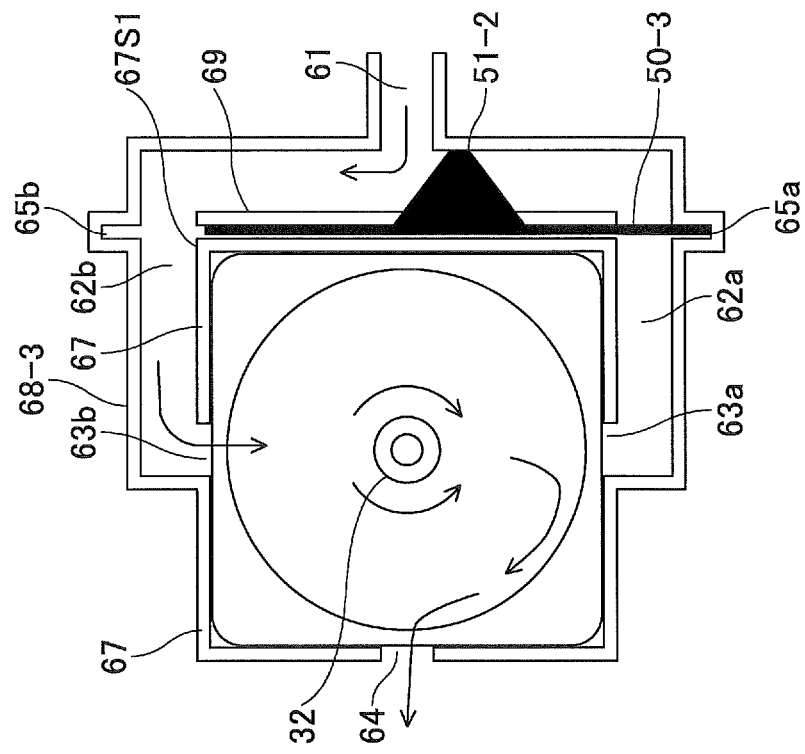
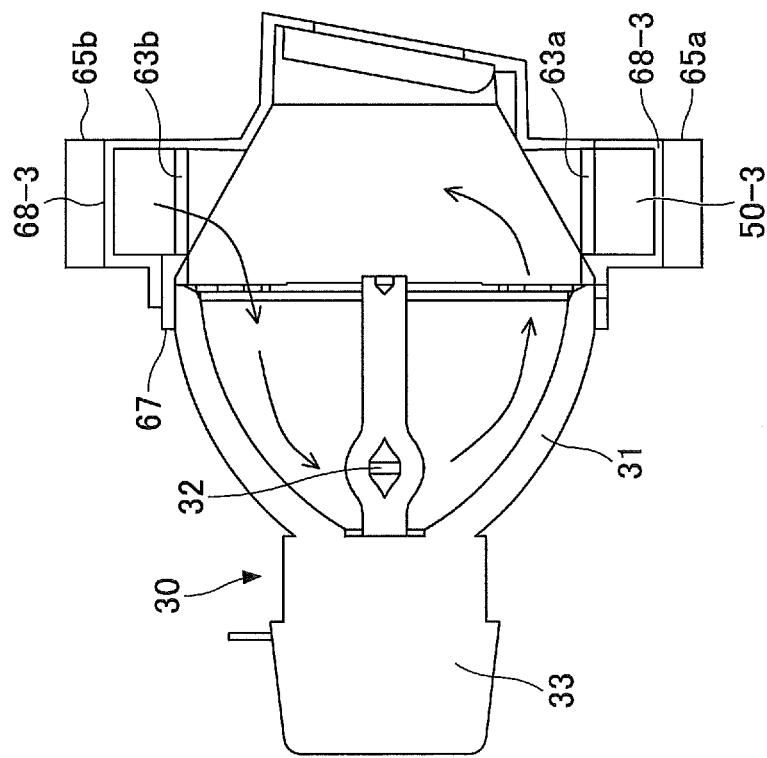

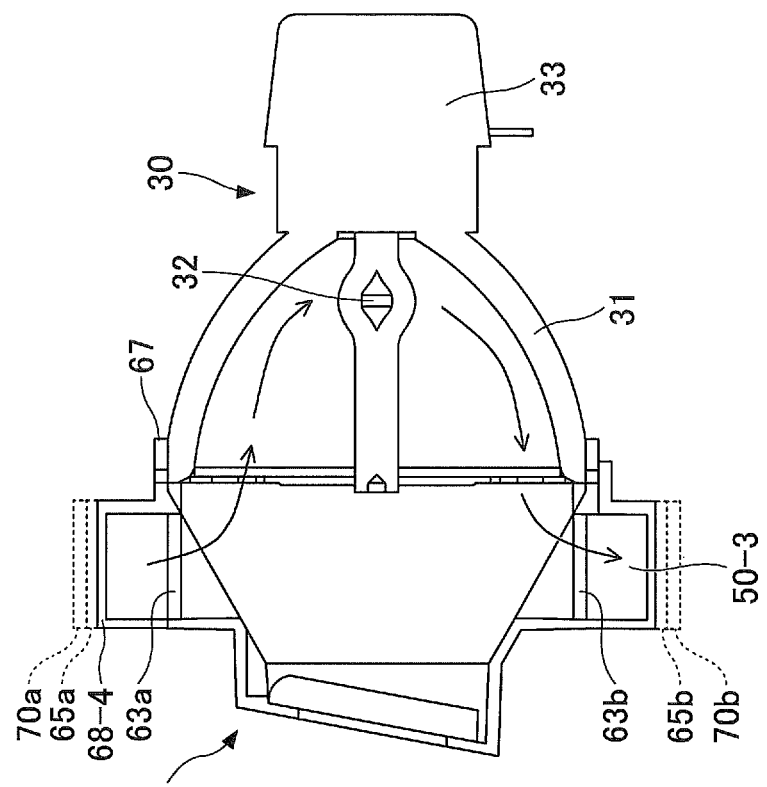
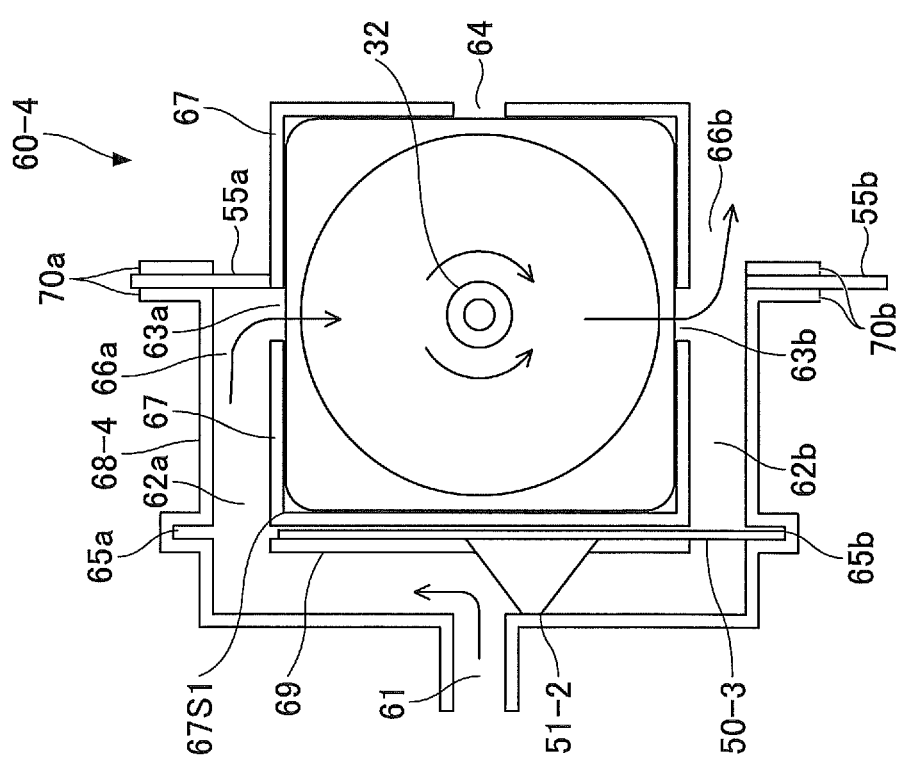
FIG.26A
FIG.26B

LIGHT SOURCE HOUSING, LIGHT SOURCE DEVICE, AND IMAGE PROJECTION APPARATUS

BACKGROUND OF THE INVENTION

1. Field of the Invention

The present invention generally relates to a light source housing to which a light source lamp is attached, a light source device including a light source lamp and a light source housing, and an image projection apparatus including the light source device.

2. Description of the Related Art

Because an upper side of a light emission tube (a bulb) inside a light source lamp of an image projection apparatus becomes hot, the upper side of the light emission tube is blown by a fan. Because a point where heat is concentrated shifts depending on a direction of installing a light emission tube inside an image projection apparatus, there is a technique of controlling an air blowing direction for example, a blow plate in conformity with the direction of installing the light emission tube.

Referring to Patent Document 1, a switch plate (an air direction plate, an open and close mechanism) rotates by its own weight so as to cool a light source lamp in conformity with the direction of installing the image projection apparatus.

Patent Document 1: Japanese Laid-Open Patent Publication No. 2011-203515

SUMMARY OF THE INVENTION

Embodiments of the present invention provide a novel and useful light source housing, a light source housing, and an image projection apparatus solving one or more of problems of the related art.

One aspect of the embodiments of the present invention may be to provide a light source housing to which a light source lamp having a light emission tube and a reflector is attached including a pair of flow paths bifurcating onto upper and lower sides of the light emission tube from an air intake port for introducing a cooling air; a flow path open and close unit that slides in a direction of the gravitational force so as to open the flow path on the upper side of the light emission tube and close the flow path on the lower side of the light emission tube; and an air outtake port that outtakes the cooling air introduced into the reflector from the flow path on the upper side of the light emission tube to an outside of the reflector.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 14A is a cross-sectional view of the light source housing illustrated in FIG. 13 taken along a line A-A and viewed in a projection direction of the light source lamp in the ordinary projection mode according to a first embodiment of the present invention.

FIG. 14B is a cross-sectional view of the light source housing illustrated in FIG. 13 taken along a line B-B and viewed in a direction orthogonal to the projection direction of the light source housing illustrated in FIG. 14A.

FIG. 15A illustrates an air flow in the cross-sectional view of FIG. 14A.

FIG. 15B illustrates an air flow in the cross-sectional view of FIG. 14B.

FIG. 16A is a cross-sectional view of the light source housing illustrated in FIG. 13 taken along the line A-A and viewed in a projection direction of the light source lamp in the projection mode of suspending from a ceiling according to the first embodiment of the present invention.

FIG. 16B is a cross-sectional view of the light source housing illustrated in FIG. 13 taken along the line B-B and viewed in a direction orthogonal to the projection direction of the light source housing illustrated in FIG. 16A.

FIG. 17A is a cross-sectional view of the light source housing illustrated in FIG. 13 taken along the line A-A and viewed in a projection direction of the light source lamp in the ordinary projection mode according to a second embodiment of the present invention.

FIG. 17B is a cross-sectional view of the light source housing illustrated in FIG. 13 taken along the line B-B and viewed in a direction orthogonal to the projection direction of the light source housing illustrated in FIG. 17A.

FIG. 19A is a cross-sectional view of the light source housing illustrated in FIG. 13 taken along the line A-A and viewed in a projection direction of the light source lamp in the projection mode of suspending from the ceiling according to the second embodiment of the present invention.

FIG. 19B is a cross-sectional view of the light source housing illustrated in FIG. 13 taken along the line B-B and viewed in a direction orthogonal to the projection direction of the light source housing illustrated in FIG. 19A.

FIG. 20A is a cross-sectional view of the light source housing illustrated in FIG. 13 taken along the line A-A and viewed in a projection direction of the light source lamp in the ordinary projection mode according to the second embodiment of the present invention.

FIG. 20B is a cross-sectional view of the light source housing illustrated in FIG. 13 taken along the line B-B and viewed in a direction orthogonal to the projection direction of the light source housing illustrated in FIG. 20A.

FIG. 21A is a cross-sectional view of the light source housing illustrated in FIG. 13 taken along the line A-A and viewed in a projection direction of the light source lamp in the projection mode of suspending from the ceiling according to a modified example of the second embodiment of the present invention.

FIG. 21B is a cross-sectional view of the light source housing illustrated in FIG. 13 taken along the line B-B and viewed in a direction orthogonal to the projection direction of the light source housing illustrated in FIG. 21A.

FIG. 22A is a cross-sectional view of the light source housing illustrated in FIG. 13 taken along the line A-A and viewed in a projection direction of the light source lamp in the ordinary projection mode according to a third embodiment of the present invention.

FIG. 22B is a cross-sectional view of the light source housing illustrated in FIG. 13 taken along the line B-B and viewed in a direction orthogonal to the projection direction of the light source housing illustrated in FIG. 22A.

FIG. 23A is a cross-sectional view of the light source housing illustrated in FIG. 13 taken along the line A-A and viewed in a projection direction of the light source lamp in the ordinary projection mode according to the third embodiment of the present invention.

FIG. 23B is a cross-sectional view of the light source housing illustrated in FIG. 13 taken along the line B-B and viewed in a direction orthogonal to the projection direction of the light source housing illustrated in FIG. 23A.

FIG. 26A is a cross-sectional view of the light source housing illustrated in FIG. 13 taken along the line A-A and viewed in a projection direction of the light source lamp in the ordinary projection mode according to the fourth embodiment of the present invention.

FIG. 26B is a cross-sectional view of the light source housing illustrated in FIG. 13 taken along the line B-B and viewed in a direction orthogonal to the projection direction of the light source housing illustrated in FIG. 26A.

DETAILED DESCRIPTION OF THE PREFERRED EMBODIMENTS

However, in a case where a blow direction is controlled, a drive source for driving a blow plate is necessary. Therefore, the apparatus becomes large and complicated.

Further, in a technique of rotating by its own weight, a freely rotatable switch plate probably opens or closes by a blow. Then, an air may inversely flow and a flow path is not stabilized to thereby prevent a cooling performance from stabilizing.

A description is given below, with reference to the FIG. 1 through FIG. 26B of embodiments of the present invention. Where the same reference symbols are attached to the same parts, repeated description of the parts is omitted.

Reference symbols typically designate as follows:
1: projector apparatus (image projection apparatus);
2: screen (image projection surface);
6: light source device;
10: casing;
17: apparatus air intake vent;
18: apparatus air outtake vent;
30: light source lamp;
31: reflector;
32: light emission tube (bulb);
40: light source base;
50, 50-1, 50-2, 50-3, 50-4: partition plate (flow path open and close unit);
51, 51-2: protruding part;
55a, 55b: second partition plate (second flow path open and close unit);
56a, 56b: protrusion;
60, 60-1, 60-2, 60-3, 60-4: light source housing;
61: air intake port;
62a, 62b: flow path;
63a, 63b: communicating path;
64: air outtake port;
65a, 65b; recess (engaging part);
66a, 66b: end opening (opening);
67: reflector retaining part;
67S, 67S1: reflector retaining side wall;
68, 68-4: casing outer wall (outer wall);
69: rail;
70: opening end part;
71: air intake fan (cooling fan);
72: air outtake fan;
100: optical engine;
110: illumination optical unit;
120: image display element unit;
130: projection optical unit;
X: direction;
Y: direction; and
Z: direction.

Figure 1:
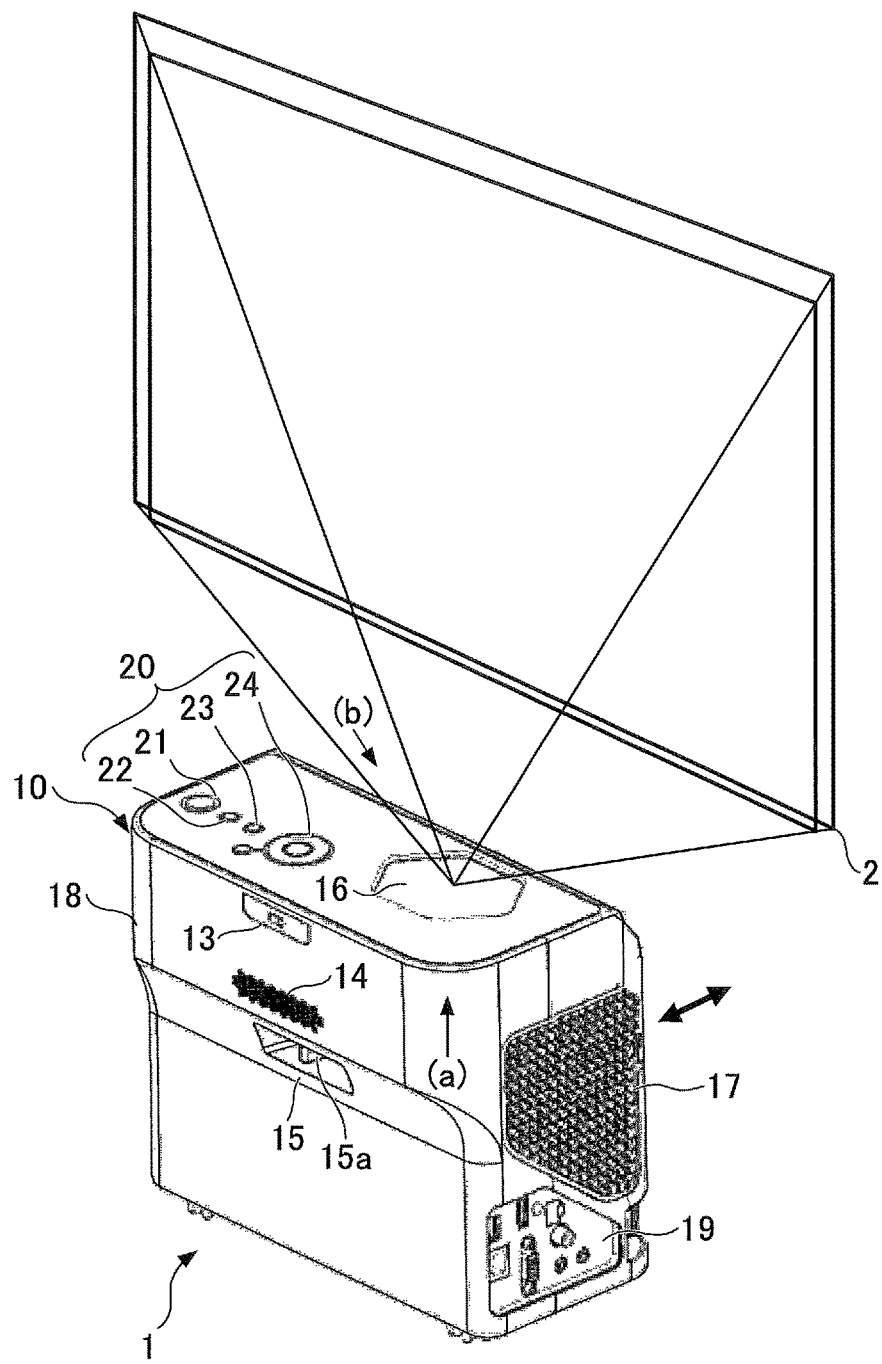
FIG. 1 is a perspective view of a projector apparatus of an embodiment of the present invention.

FIG. 1 is a perspective view of a projector apparatus 1 which is an electronic apparatus of an embodiment.

[Structure of Projector Apparatus]

Hereinafter, referring to FIGS. 1 to 16, a common structure of the projector apparatus of embodiments of the present invention is described. FIG. 1 is a perspective view of a projector apparatus 1 which is an electronic apparatus of the embodiment.

The projector apparatus 1 is a compact tower-type apparatus and is formed by surrounding an inner structure with a casing 10.

The outer shape of the casing of the projector apparatus 1 illustrated in FIG. 1 is long in the vertical direction and is substantially a rectangular parallelepiped as a whole. Referring to FIG. 1, a width direction (a direction of a single axis on the horizontal face) of the projector apparatus 1 is designated as an X axis direction, a depth direction (a direction orthogonal to the X axis direction on the horizontal face) of the projector apparatus 1 is designated as a Y axis direction, and a height direction (a vertical direction) of the projector apparatus 1 is designated as a Z axis direction.

Referring to FIG. 1, an outer structure of the projector apparatus 1 is described.

An exterior (a casing) 10 covering a main body includes a front cover 10a, a rear cover 10b, and a bottom wall 10c. The material of the casing 10 is relatively light and tough such as a plastic (a hard resin).

Referring to FIG. 1, a light receiving sensor 13, a sound emission port 14, and a focusing lever 15a are arranged on a front wall (a wall on a side of −Y being opposite to a projection direction) from an upper side to a lower side of the front wall.

Figure 2A:
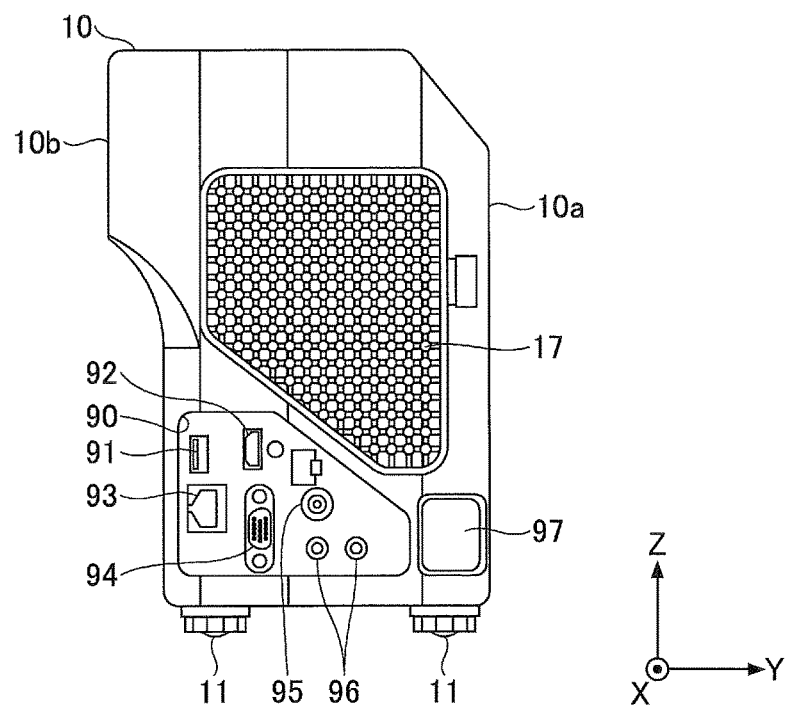
FIG. 2A is a right side view of the projector apparatus.
Figure 2B:
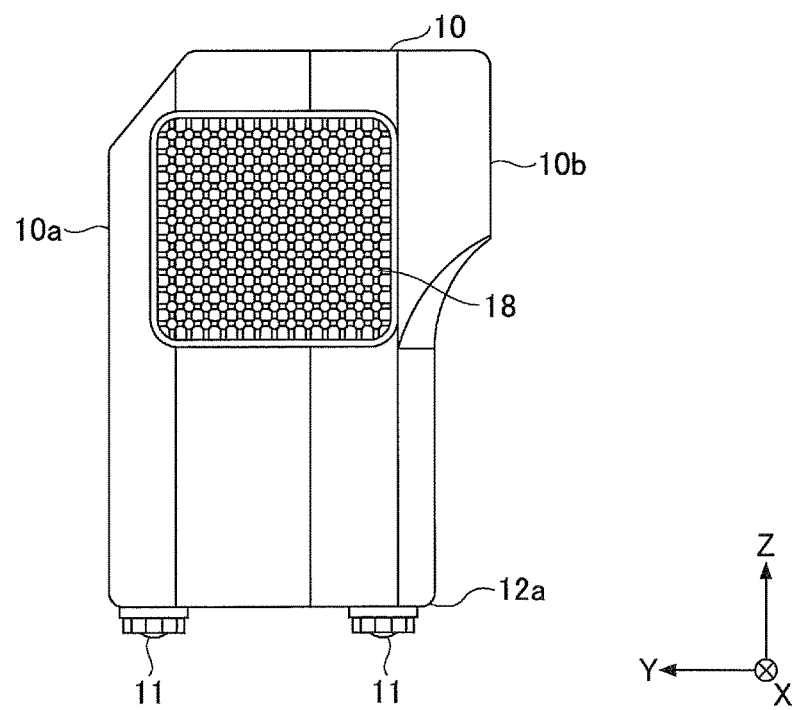
FIG. 2B is left side view of the projector apparatus.

The light receiving sensor 13 receives a light signal from a remote controller (not illustrated) and converts the light signal to an electric signal and outputs the electric signal to a control device 81 (see FIG. 2B).

The sound emission port 14 is formed of multiple through holes for emitting a sound output from a speaker (not illustrated).

The focusing lever 15a is provided inside a window 15 being an area for operation. A user operates the focusing lever 15a to adjust a focal position (a focus) of a projection lens 131 included in a projection optical unit 130 (see FIG. 3).

The focusing lever 15a is structured so as to be slidable in the X-axis direction, which is a width direction of the projector apparatus 1. The focusing lever 15a is mechanically connected to the projection lens 131 through a driving force transmission mechanism (not illustrated) such as a gear. The driving force transmission mechanism moves a part of a lens element forming the projection lens 131 along with a slide motion of the focusing lever 15a. With this, the focal position of the projection lens 131 can be adjusted.

Specifically, in adjusting the position of the projector apparatus 1, after locating the projector apparatus 1, the focusing lever 15a is used to adjust the focus. When the focusing lever 15a is driven in one of the X-axis directions (or one of the Z-axis directions), a position (the focal position) where a light projected through the projection lens 131 forms an image becomes far. On the other hand, when the focusing lever 15a is driven in the other one of the X-axis directions (or the other one of the Z-axis directions), a position (the focal position) where a light projected through the projection lens 131 forms an image becomes near.

Further, as illustrated in FIG. 1, a light projection port 16 and an operation unit 20 are provided on the upper surface of the casing 10 (the upper wall in the direction of "+Z"). The light projection port 16 is an opening formed on a side near a projection side on the upper wall of the casing 10 and having a shape of polygon (e.g., a hexagon) in its plan view. The light projection port 16 is closed by a transparent or a translucent lid member. A light from the projection optical unit 130 can be projected to an outside of the casing through the lid member closing the light projection port 16.

The operation unit 20 has multiple parts (for example, six operation buttons) provided on the upper surface of the casing 10. A power button 21, an input button 22 (an input output switching button), a mute button 23, and an enter button 24 (a determination button) are arranged on the upper surface of the casing 10 in an area of the direction of "−X" of the light projection port 16 from left to right on FIG. 1.

Short legs 11 are provided on the lower side of the casing 10. The number of the legs 11 is at least three and the legs 11 are not arranged on the same straight line. In the projector apparatus 1, each structural element is arranged inside the casing 10 so that a weight balance is shifted to a side of the direction of "−Y" (heavier on the direction of "−Y" than on the direction of "+Y"). Therefore, the center of gravity is positioned in the direction of "−Y" (on the side of projecting the image) from the center of the casing 10. With this structure, the upper surface having the light projection port 16 can tilt toward a projection face side where the screen is arranged.

In order to set the center of gravity in this way, according to the embodiment, two legs 11 among the three legs 11 are arranged at a corner of the directions of "−Y" and "+X" and a corner of the directions of "−Y" and "−X" on the bottom wall 10c of the casing 10, and the remaining one leg is arranged at the center of an edge in the direction of "+Y". With this arrangement, the projector apparatus 1 is supported by the three legs 11 on a predetermined horizontal surface so as to tilt while being hard to fall down. The positions of the three legs 11 are not limited to that described above. It is sufficient that the three legs 11 are positioned at appropriate positions depending on a weight balance of the projector apparatus 1.

FIG. 2A is a right side view of the projector apparatus 1. FIG. 2B is left side view of the projector apparatus 1. Referring to FIG. 2A, the apparatus air intake vent 17 is provided. Under the apparatus air intake vent 17, a connector unit 19 having multiple terminals is formed. The apparatus air intake vent 17 is connected to an air intake fan 71 (see FIG. 3B) through a duct or the like.

Under the apparatus air intake vent 17, the connector unit 19 having the multiple connection terminals is formed. The reference symbol 97 designates a power connection terminal for connecting to an outer power source. Six connection terminals among seven connection terminals are arranged at two stages in the vertical direction in the connector unit 19 inside a recess 90 formed on the right side wall of the casing 10. At the upper stage inside the recess 90, a USB terminal 91 for inputting into an external device (e.g., an external memory such as a USB memory), and a HDMI terminal ("HDMI" is a registered trademark) 92 for connecting to AV equipment are sequentially arranged from the direction of "−Y" to the direction of "Y". At the lower stage of the recess 90, a LAN terminal 93 for communication, a computer terminal 94, a video input terminal 95, and an audio input terminal 96 are sequentially arranged from the direction of "−Y" to the direction of "Y".

Referring to FIG. 2B, an apparatus air outtake vent 18 is provided on the other side surface in the direction of "−X". Referring to FIG. 3B, in the vicinity of the apparatus air outtake vent 18, an air outtake fan 72 is provided.

Here, the projector apparatus generates an image based on image data input from a personal computer, a video camera, or the like and projects the image onto the screen 2 or the like (see FIG. 1). In recent years, among projector apparatuses, a liquid crystal projector is especially advancing in terms of a higher definition of a liquid crystal panel, an improvement of brightness along with a higher efficiency of a light source lamp, and a lower price. Further, among the liquid crystal projectors, there is a small sized and light weighted liquid crystal projector using digital micro-mirror device (DMD), which are widely used in business offices, schools, and homes. Especially, a liquid crystal projector of a front type has an improved portability and is used for a small meeting of several persons.

In recent years, it is requested for the projector apparatus to "enable to project a large sized screen image (a larger projection screen)" and to "enable to minimize a projection space required outside the projector apparatus".

In order to respond to this request, the following internal structure is adopted in the projector apparatus 1 of the embodiment.

Figure 3A:
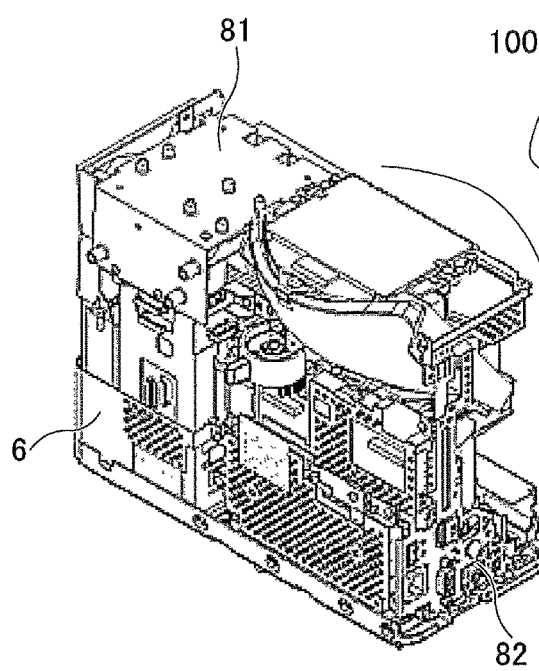
FIG. 3A is a perspective view of an inside of the projector viewed in a direction of FIG. 1.
Figure 3B:
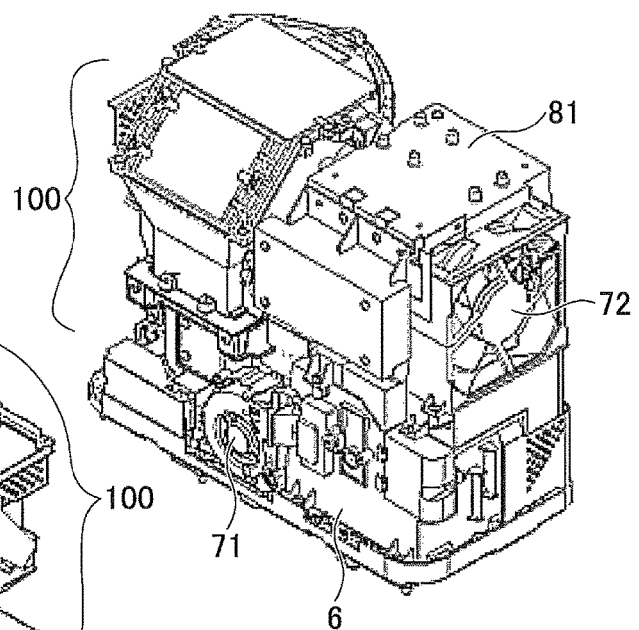
FIG. 3B is a perspective view of the inside of the projector viewed in a direction away from the direction of FIG. 1.

Referring to FIG. 3A to FIG. 10, the internal structure of the projector apparatus 1 is described. FIGS. 3A and 3B are perspective views of the projector apparatus 1 with its exterior cover removed and viewed from different directions.

As the internal structure, the projector apparatus 1 includes a light source device 6, an optical engine 100 (see FIG. 5), a control device 81, and so on inside a casing (the exterior cover) 10.

The control device 81 performs various control operations in conformity with a command content corresponding to the electric signal converted by the light receiving sensor 13 and a signal received from the operation unit 20. The control device 82 is connected to the connector unit 19 and relays the input information received from the terminal to the control device 81 or an image display element unit 120.

Figure 4:
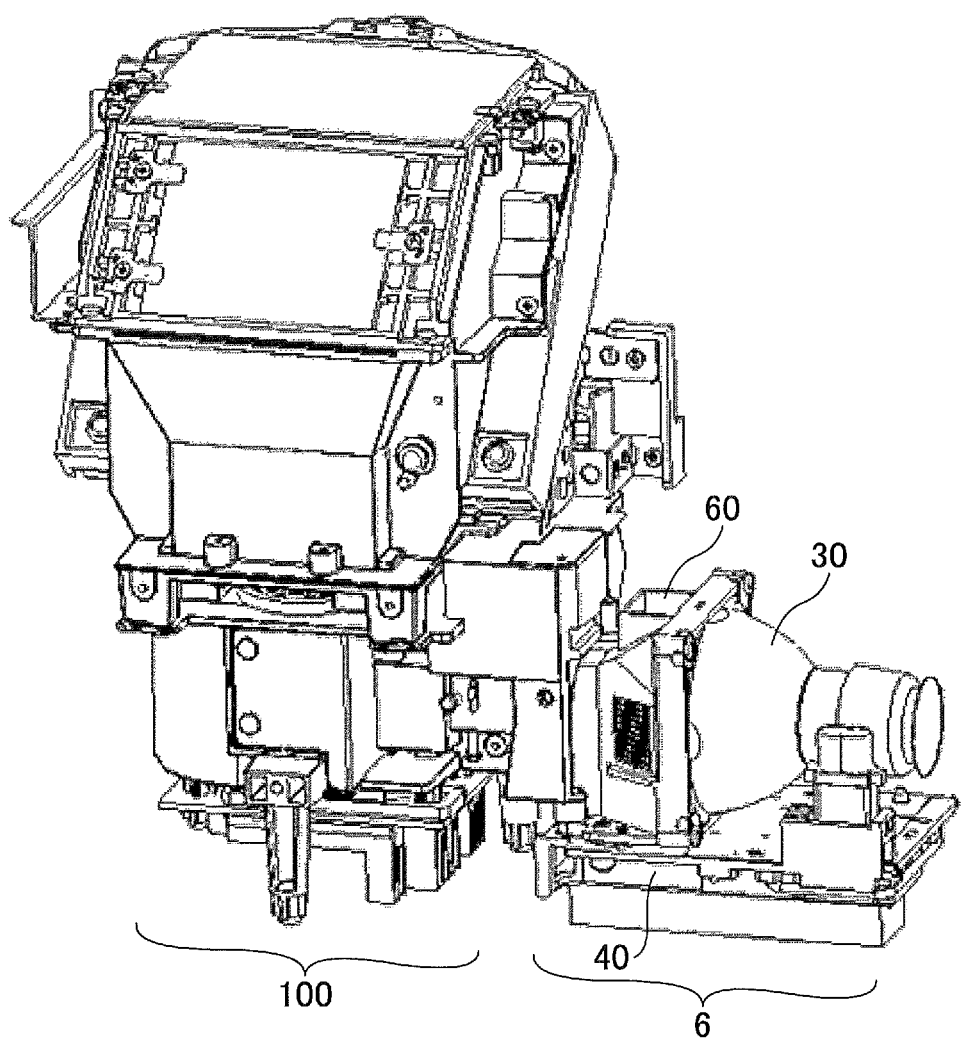
FIG. 4 illustrates an arrangement of an optical engine and a light source device.

FIG. 4 is a perspective view of an optical system including the light source device 6 and the optical engine 100 of the projector apparatus 1.

Referring to FIG. 4, as an example, the light source device 6 includes a light source lamp 30 that includes a light emission tube 32 and a reflector 31 surrounding the light emission tube 32 and having an opening directing along the direction of "+X" (the left side of FIG. 6) and so on. Here, the light emission tube 32 is, for example, a high-pressure mercury lamp. For example, the reflector 31 is shaped like a cup having an inner wall surface being a reflection surface.

The light source device 6 further includes a light source housing 60, to which the light source lamp 30 is attached, and a light source base member 40 for mounting the light source housing 60 on the light source base member 40. The light source device 60 retains the light source lamp 30 and cools the light source lamp 30 by circulating an air. The air intake fan 71 and the air outtake fan 72 (see FIG. 3B) are connected to the light source housing 60 through a duct. The air intake fan 71 takes an outer air from the apparatus air intake vent 17 (see FIG. 2A), and the air outtake fan 72 sends the air from the apparatus air outtake vent 18 (see FIG. 2B) to the outside.

A part of a light (a white light) emitted from the light emission tube 32 directly goes out from the opening and another part of the light (the white light) emitted from the light emission tube 32 reflects on the inner wall surface (the reflection surface) of the reflector 31 and goes out from the opening. A synthetic light including the part and the other part of the light (the white light) emitted from the light emission tube 32 goes out from the light source lamp 30 of the light source device 6. The light going out from the light source lamp 30 enters a color wheel 111 (see FIG. 6) of the illumination optical unit 110.

Figure 5:
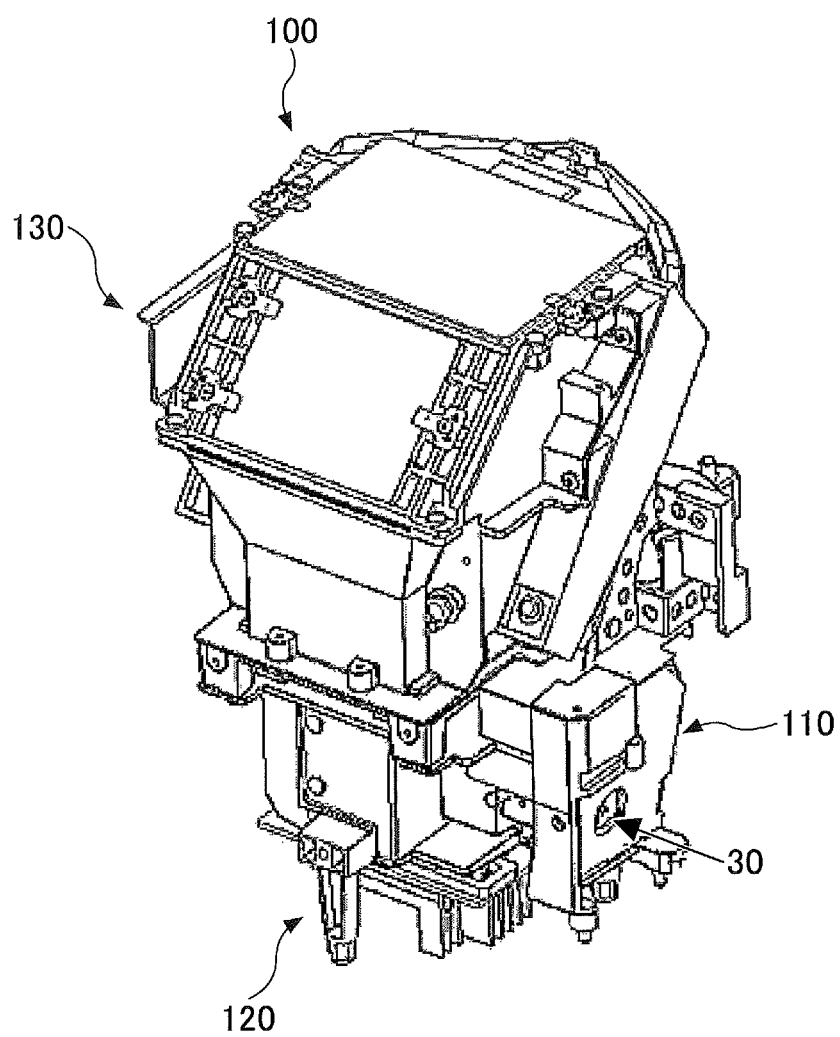
FIG. 5 illustrates a structure of the optical engine.

FIG. 5 is a perspective view of the optical engine 100. Referring to FIG. 5, the optical engine 100 includes an illumination optical unit 110, an image display element unit (an image forming unit) 120, and a projection optical unit 130. The illumination optical unit 110 disperses the white light from the light source lamp 30 to RGB (three primary colors of light) and guides the dispersed light to the image display element unit 120. The image display element unit 120 modulates the light from the illumination optical unit 110 in response to an image signal from the external device to generate an image. The projection optical unit 130 enlarges the generated image and projects the enlarged image.

Figure 6:
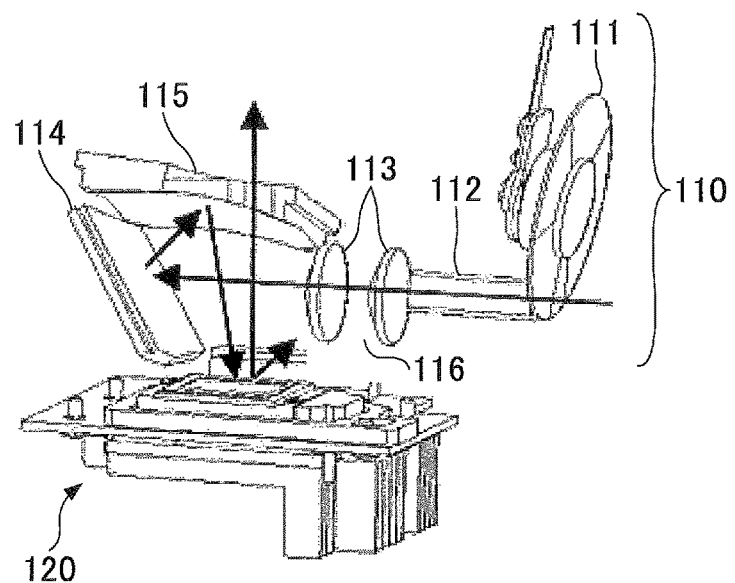
FIG. 6 illustrates an illumination optical unit.

FIG. 6 illustrates a structure and a light path of the illumination optical unit 110. Referring to FIG. 6, the illumination optical unit 110 includes the color wheel 111, a light tunnel 112, a relay lens 113, a cylindrical mirror 114, a concave mirror 115, and an OFF light plate 116 (see FIG. 8). The color wheel 111 is disk-like color filters that convert the white light from the light source lamp 30 to each color of RGB every unit time. Thus, repeatedly changing RBG color lights can go out from the color wheel 111. The light tunnel 112 is formed like a tube by cementing flat glasses and guides the light from the color wheel 111. The relay lens 113 is formed of a combination of two lenses and converges the light from the light tunnel while correcting a chromatic aberration of the light. The cylindrical mirror 114 reflects the light from the relay lens 113. The concave mirror 115 reflects the light reflected by the cylindrical mirror toward a DMD element 121 of the image display element unit 120.

Figure 7:
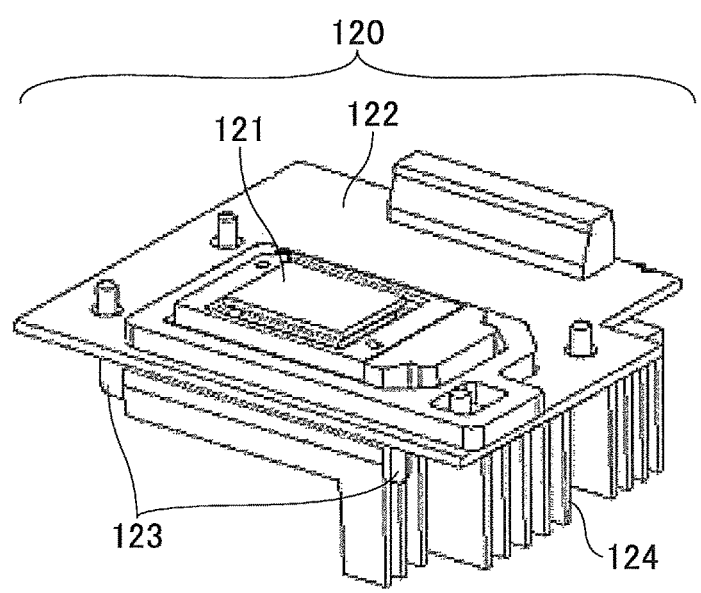
FIG. 7 illustrates an image display element unit.

FIG. 7 is a perspective view of the image display element unit 120. Referring to FIGS. 6 and 7, the image display element unit 120 includes the DMD element 121, a DMD printed circuit board 122, a heatsink 123, and a fixed plate 124.

The DMD element 121 includes multiple micro-mirrors and reflects the light from the concave mirror 115 of the illumination optical unit 115 of the illumination optical unit 110 while performing a time-division drive of each micro-mirror so that an image (an image light) based on image information is generated. The DMD element 121 reflects the light used to generate the image toward the projection lens 131 of the projection optical unit 130 and the light (a discarded light) unnecessary to generate the image toward the OFF light plate 116 (see FIG. 8).

The DMD element 121 is mounted on the DMD printed circuit board 122. The heatsink 123 cools the DMD element 121 and the DMD printed circuit board 122, which generate heat. The fixed plate 124 pushes the heatsink 123 onto the DMD printed circuit board 122.

Figure 8:
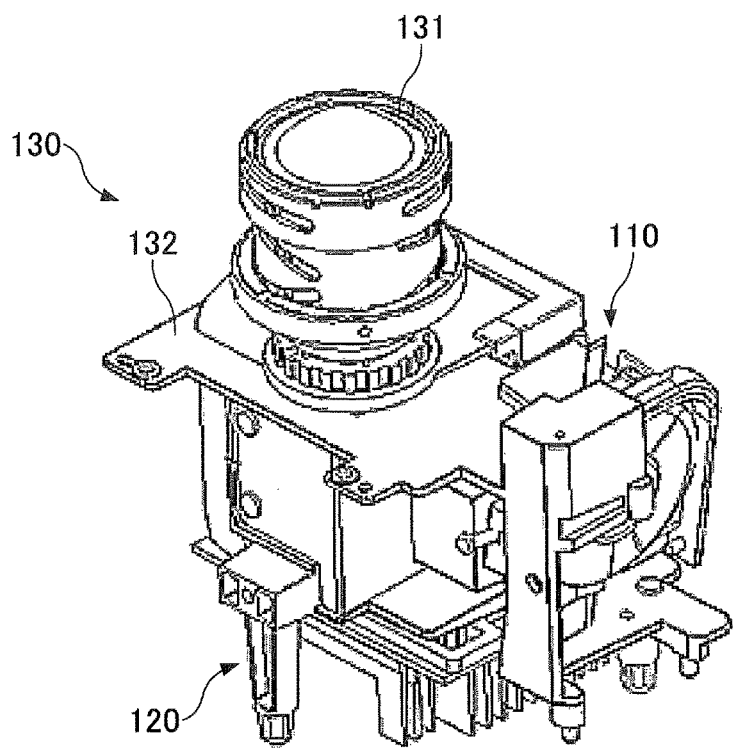
FIG. 8 illustrates a projection lens, an illumination optical unit, and an image production unit.

FIG. 8 illustrates the illumination optical unit 110, the image display element unit 120, and a projection lens 131 of the projection optical unit 130. The light reflected by the DMD elements and used to generate the image is reflected toward the projection lens 131, and the discarded light is reflected toward the OFF light plate 116.

Figure 9:
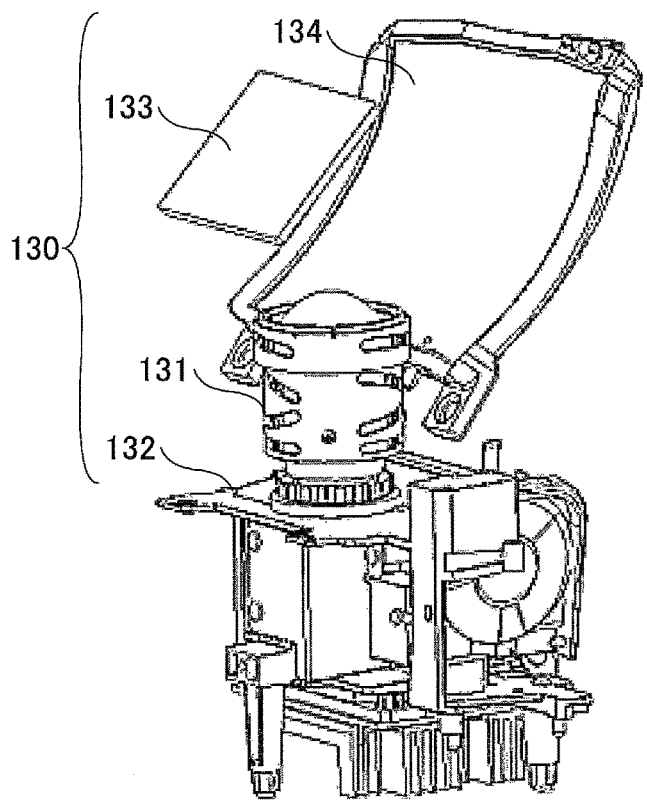
FIG. 9 is a perspective view for explaining a projection optical unit.
Figure 10:
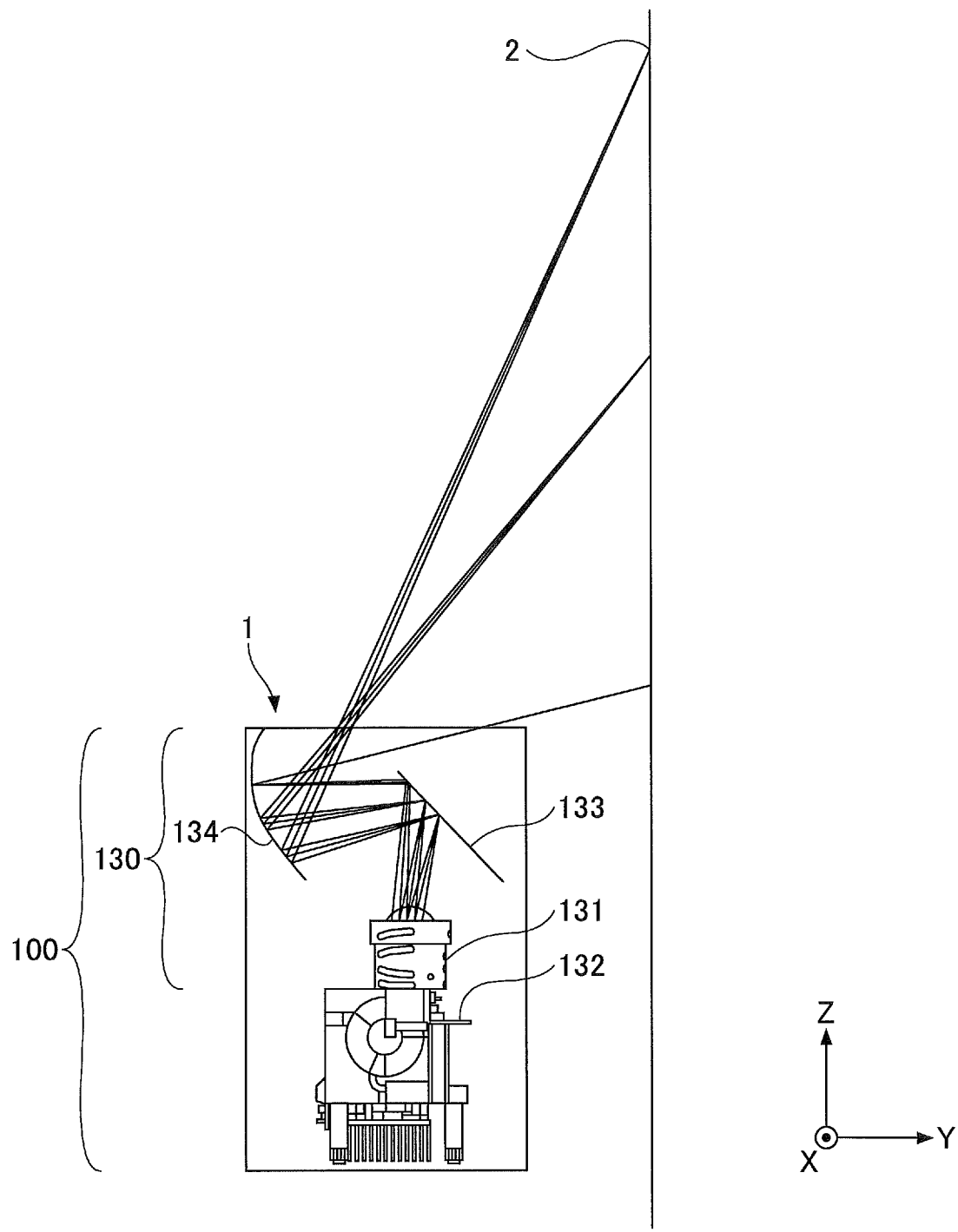
FIG. 10 is a side view illustrating the projection optical unit.

FIG. 9 is a perspective view illustrating the projection optical unit 13. FIG. 10 is a side view of a state where the projection optical unit 130 is projecting the image to a screen 2. Referring to FIGS. 9 and 10, the projection optical unit 132 includes an illumination housing 132 retaining the projection lens 132, a return mirror 133, and a free curved surface mirror 134. At the return mirror 133, the light path of the image light enlarged by the projection lens 131 is returned. The free curved surface mirror 134 reflects and enlarges the image light from the return mirror 133. The projection optical unit 130 is an optical system having an extremely short focal length.

By adopting the projection optical unit 130 having the optical system having the extremely short focal length for the projector apparatus 1 of the embodiment, the projector apparatus 1 can be arranged close to the screen 2 to which the light is projected. Thus, the compact tower type projector apparatus 1 requiring a small installation area is obtainable.

Figure 11:
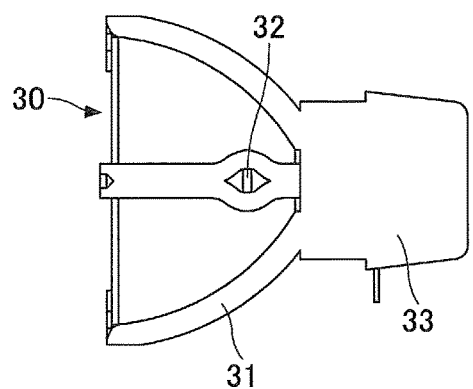
FIG. 11 is a cross-sectional view viewed from a side of the light source lamp.

FIG. 11 is a side cross-sectional view of the light source lamp 30 of the light source device 6. Referring to FIG. 11, the reference symbol 31 designates a reflector, the reference symbol 32 designates a light emission tube (the bulb), and the reference symbol 33 designates a sealing portion on a reflector hole side. A standard value in a predetermined temperature range of a temperature at a time lighting the light source lamp 30 is provided for a longer lifetime.

By an influence of thermal convection or the like, a temperature increase is greater on the upper side of the direction of the gravitational force and therefore the light emission tube 32 is apt to cause a temperature difference between the upper and lower sides. If the temperature excessively increases on the upper side of the light emission tube 32, a base material of the light emission tube will recrystallize. Therefore, white turbidity may be caused. If the temperature excessively decreases on the lower side of the light emission tube 32, a halogen cycle of the base material of the light emission tube cannot be normally performed and the base material is attached to the inner wall of the light emission tube. Therefore, the light emission tube may be blackened. The white turbidity and the blacked light emission tube cause a shorter lamp lifetime and the light emission tube is apt to be broken or degraded by a temperature increase.

Therefore, it is necessary to more effectively cool the upper side more than the lower side so as not to cause a temperature difference between the upper and lower sides of the light emission tube 32.

Because the upper side of the light emission tube 32 moves depending on the posture of installing the image projection apparatus, it is necessary to cool the upper side of the light emission tube 32 regardless of the posture of installing the image projection apparatus in order to maintain a longer lifetime of the light source lamp 30.

Figure 12A:
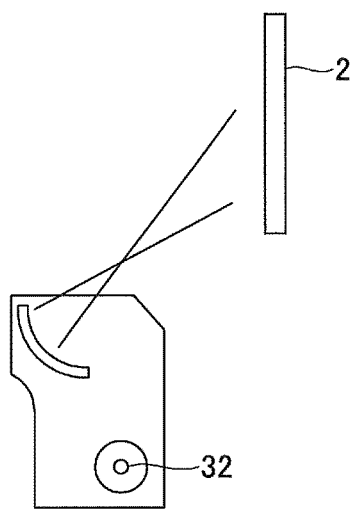
FIG. 12A illustrates an ordinary projection posture of the projector apparatus.
Figure 12B:
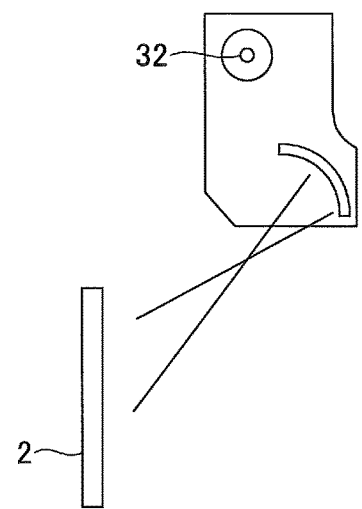
FIG. 12B illustrates a posture of suspending from a ceiling.

As an example, the posture of installing the projector apparatus 1 can be classified into an ordinary projection posture as illustrated in FIG. 12A and a projection posture of suspending from a ceiling as illustrated in FIG. 12B. Said differently, the projector apparatus 1 can be used in two different postures of installing the projector apparatus 1 where the upper and lower positions of the light source device (a light source unit) 6 are different.

Specifically, in the ordinary projection posture, an image is projected on the screen 2, which is vertically extended, in an obliquely upward direction from an obliquely downward position as illustrated in FIG. 12A. In the projection posture of suspending from the ceiling, the ordinary projection posture is turned by 180° around the X-axis and the image is projected on the screen 2, which is vertically extended, in an obliquely downward direction from an obliquely upward position as illustrated in FIG. 12B.

As clearly shown from FIGS. 12A and 12B, a part positioned on an upper side of the light emission tube 32, namely a part of the light emission tube 32 to have a high temperature, changes depending on the posture of installing the light source device 6.

Therefore, it is necessary to cool the upper side of the light emission tube (the part of the light emission tube 32 to have the high temperature) in any posture of installing the projector apparatus 1 (the light source device 6), in order to obtain a longer lifetime of the light emission tube 32.

Therefore, in the embodiment of the present invention, the following structure is adopted to cool the light source lamp 30 of the projector apparatus (the image projection apparatus) 1.

<Light Source Housing>

Figure 13:
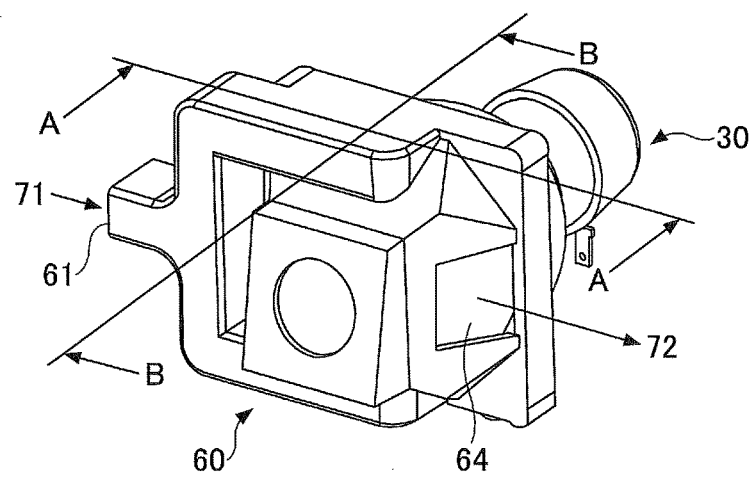
FIG. 13 is a perspective view of the light source housing of the embodiment in the ordinary projection mode.

FIG. 13 is a perspective view of the light source housing 60 (60-1, 60-2, 60-3, 60-4) in the ordinary projection mode of the embodiments of the present invention.

An air intake port 61 being an opening formed on a side surface of the light source housing 60 is connected to an air intake fan (a cooling fan) 71 illustrated in FIG. 3B, and an air outtake port 64 being an opening formed on another side surface of the light source housing 60 is connected to an air outtake fan 72 illustrated in FIG. 3B.

In the light source housing 60 of the first to fourth embodiments of the present invention, flow paths 62a and 62b are formed so as to bifurcate a cooling duct (a passage way) from the air intake port to the upper and lower sides of the light emission tube 32 and a partition plate 50 slidable by its own weight is provided so as to cool the light emission tube 32 of the light source lamp 30. When one of the flow paths 62a and 62b is closed by the slide motion of the partition plate 50 by its own weight, it is possible to cool the upper side of the light emission tube 32 of the light source lamp regardless of the posture of installing the projector apparatus 1. Detailed operation is described below.

First Embodiment

FIGS. 14A and 14B are cross-sectional views of the light source housing 60 illustrating, for example, a state where the projector apparatus 1 is placed on a desk and a light is projected toward a wall. Specifically, FIG. 14A is a cross-sectional view of the light source housing 60 taken along a line A-A and viewed against the projection direction of the light source lamp 30. Specifically, FIG. 14B is a cross-sectional view of the light source housing 60 taken along a line B-B and viewed from a direction orthogonal to the projection direction of the light source lamp 30.

In the light source housing 60 of the first embodiment, a cooling air blown from the air intake fan 71 (see FIG. 3B) and passes through the apparatus air intake vent 17 is introduced into the air intake port 61. The cooling air introduced into the air intake port 61 passes through the flow paths (the cooling ducts) 62a and 62b, and is further introduced from communication ports 63a and 63b into the light source lamp 30. The cooling air introduced into the light source lamp 30 cools the light emission tube 32 and thereafter exhausted from the air outtake port 64 outside the light source lamp 30. The air outtake fan 72 causes the air used for the cooling and heated to pass through apparatus air outtake vent 18 (see FIG. 2B) so as to be exhausted outside the projector apparatus 1.

The pair of the flow paths 62a and 62b are arranged so as to bifurcate the cooling air introduced from the air intake port 61. The communication port 63a is formed on the downstream side of the flow path 62a so as to communicate with the reflector 31 in a direction of the gravitational force. The communication port 63b is formed on the downstream side of the flow path 62b so as to communicate with the reflector 31 in the direction of the gravitational force. The communication port 63a is positioned on the upper side of the light emission tube 32. The communication port 63b is positioned on the lower side of the light emission tube 32.

The light source housing 60 is a casing and includes a reflector retaining part 67 and a casing outer wall 68 being an outer wall of the housing. An end of the reflector 31 is engaged with a reflector retaining part 67, which is shaped like a box, surrounds the end of the reflector 31, and retaining the reflector 31. Referring to FIG. 14A (on the near side of the light source housing 60 in FIG. 13), a side wall 67S, a half of a ceiling 67B, and a half of a bottom surface 67C of the reflector retaining part 67 are externally surrounded by a casing outer wall 68. The flow paths 62a and 62b are formed by spaces among the side wall 67S, the ceiling 67B, and inner surfaces of the casing outer wall 68. The reflector retaining side wall 67S does not include an opening such as the communication ports 63a and 63b, the air outtake port 64, or the like.

The light source housing 60 includes the casing outer wall 68, which is a casing, the reflector retaining part 67, and the partition plate (i.e., a switching mechanism, or the flow path open and close unit) 50, which is a plate-like member slidable in the direction of the gravitational force by its own weight. The position of the partition plate 50 is determined when the partition plate 50 contacts the inner surface of the casing outer wall 68 in the flow path 62a or the flow path 62b, which exists in the direction of the gravitational force.

Within the first embodiment, the reflector retaining side wall 67S has a double-walled structure, and the partition plate 50 is slidable between two walls of the reflector retaining side wall 67S. Instead of the double-walled structure of the reflector retaining side wall 67S of the light source housing 60, rails 69 may be formed to protrude from inner side surfaces of the casing outer wall 68, and the partition plate 50 may be installed between the protruding rails 69 and a reflector retaining side wall 67S1 as illustrated in FIG. 18.

With this structure, it is possible to selectively close the flow path 62a or the flow path 62b when the partition plate 50 slidably moves in the direction of the gravitational force by its own weight.

FIGS. 15A and 15B illustrate an air flow flowing inside the light source housing 60 in the ordinary projection mode illustrated in FIGS. 14A and 14B. When the projector apparatus 1 is set for the ordinary projection mode, the partition plate 50 moves downward in the direction of the gravitational force (the downward direction in FIGS. 15A and 15B so as to close the flow path 62b.

In this state, the cooling air introduced from the air intake port 61 into the light source housing 60 passes through the flow path 62a and is introduced from the communication port 63a into the light source lamp 30. The cooling air introduced into the light source lamp 30 moves downward along the inner surface of the reflector 31 and cools the upper side of the light emission tube 32. The cooling air heated while cooling the light emission tube 32 is exhausted outside the light source lamp 30 from the air outtake port 64.

At this time, although the cooling air is introduced inside the flow path 62b after passing through the communication port 63b, the partition plate 50 prevents a back flow from occurring. Because the cooling air collides with the partition plate 50 in a direction perpendicular to the slide direction of the partition plate 50, even if the air flow rate of the cooling air increases, the partition plate 50 does not slide so as to open the flow path 62b. Therefore, the cooling air does not flow back.

FIG. 16 illustrates the air flow in the projection mode of suspending from the ceiling inside the light source housing 60 illustrated in FIGS. 14A and 14B. When the projector apparatus 1 is set for the projection mode of suspending from the ceiling, the partition plate 50 moves downward in the direction of the gravitational force (the downward direction in FIGS. 16A and 16B so as to close the flow path 62a.

In this state, the cooling air introduced from the air intake port 61 into the light source housing 60 passes through the flow path 62b and is introduced from the communication port 63b into the light source lamp 30. The cooling air introduced into the light source lamp 30 moves downward along the inner surface of the reflector 31 and cools the upper side of the light emission tube 32. The cooling air heated while cooling the light emission tube 32 is exhausted outside the light source lamp 30 from the air outtake port 64.

At this time, although the cooling air is introduced inside the flow path 62a after passing through the communication port 63a, the partition plate 50 prevents a back flow from occurring. Because the cooling air collides with the partition plate 50 in a direction perpendicular to the slide direction of the partition plate 50, even if the air flow rate of the cooling air increases, the partition plate 50 does not slide so as to open the flow path 62a. Therefore, the cooling air does not flow back.

As described above, in the light source housing 60 of the first embodiment in any one of the ordinary projection posture and the projection posture of suspending from the ceiling, the cooling air can be blown onto the upper side of the light emission tube 32 so as to cool the upper side of the light emission tube 32.

When one of the flow paths 62a and 62b is closed by the slide motion of the partition plate 50 by its own weight, it is possible to cool the upper side of the light emission tube 32 of the light source lamp 30 regardless of the posture of installing the projector apparatus (the image projection apparatus) 1.

The length of the partition plate 50 in the direction of the gravitational force is the sum of the height of the side wall 67S of the reflector retaining part 67 and the heights inside the flow paths 62a and 62b in the direction of the gravitational force. The partition plate 50 is made of a resin such as liquid crystal polymer (LCP) or a metal and has a thickness of 1 to 2 mm.

Because the partition plate 50 is installed so as to be movable in the direction perpendicular to the flow path and has a sufficiently great volume and weight in comparison with the cross-sectional area of the flow path, even when the flow path is closed, the air direction plate does not move so as to stabilize the air flow.

Second Embodiment

FIGS. 17A and 17B illustrate an air flow in a light source housing 60-1 in the ordinary projection mode of a second embodiment. Specifically, FIG. 17A is a cross-sectional view of the light source housing 60-1 taken along a line A-A and viewed against the projection direction of the light source lamp 30. Specifically, FIG. 17B is a cross-sectional view of the light source housing 60-1 taken along the line B-B and viewed in a direction orthogonal to the projection direction of the light source lamp 30.

Within the second embodiment, the partition plate 50-1 has a protruding part 51 at a position where the cooling air from the air intake port 61 bifurcates to the flow paths 62a and 62b. In either posture illustrated in FIGS. 17A and 17B or FIGS. 19A and 19B, when a tip end of the protruding part 51 closes an entrance of the flow paths 62a or 62b, which exists on the lower side, the protruding part 51 is arranged so as to contact the lower end of the air intake port 61.

Figure 18B:
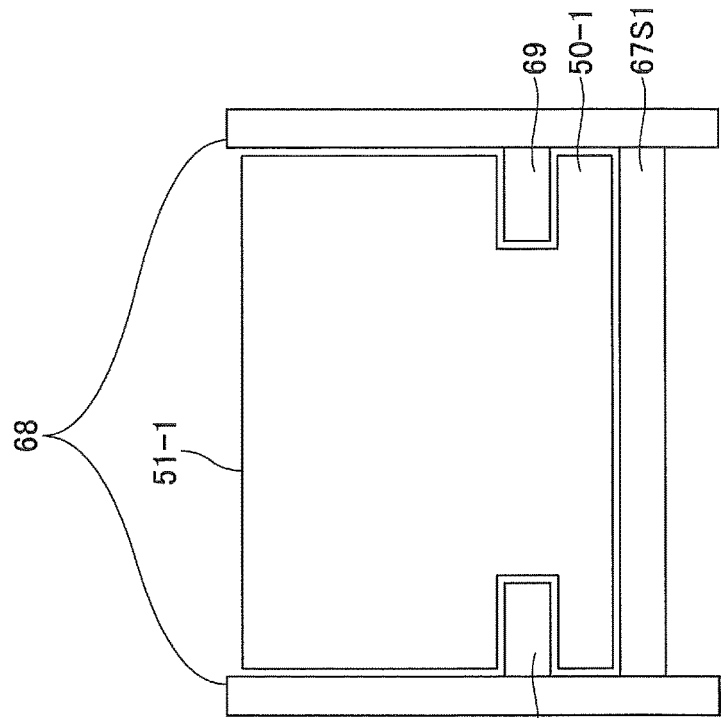
FIG. 18B is a cross-sectional view of the partition plate of the second embodiment and a vicinity of the partition plate.
Figure 18A:
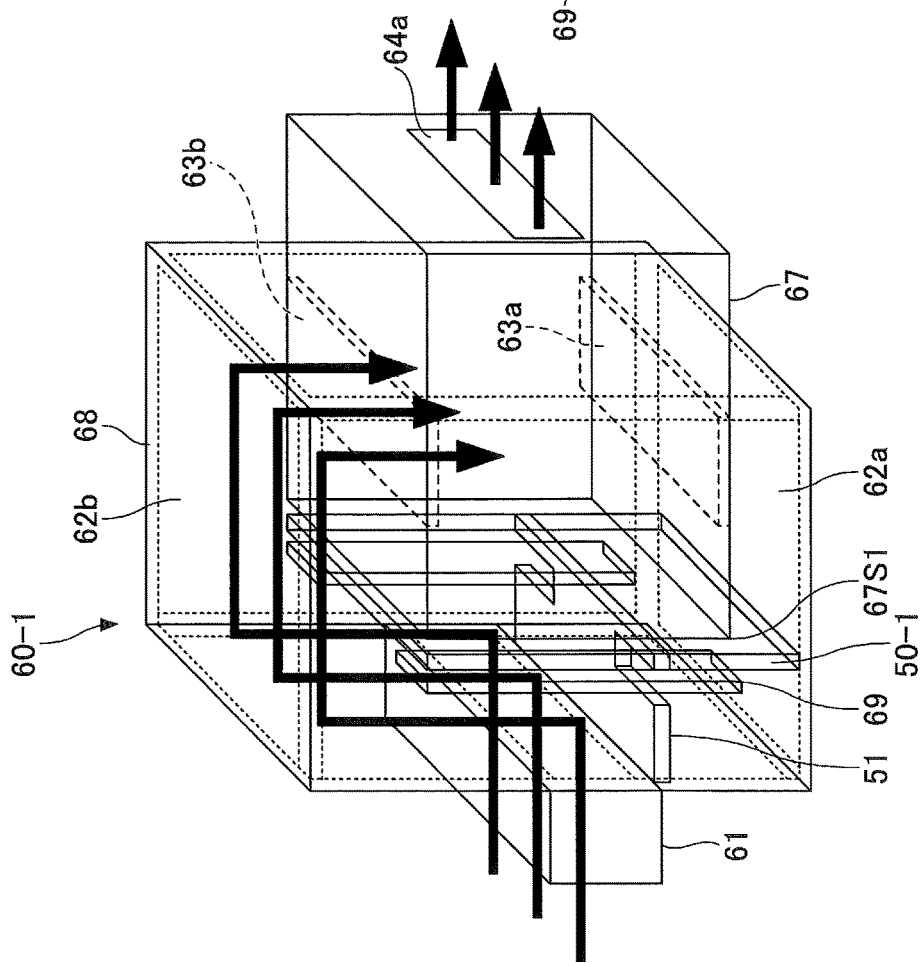
FIG. 18A is a transparent perspective view of a partition plate of a light source housing and the light source housing in their crosssections.

FIG. 18A is a transparent perspective view of the light source housing 60-1 in the ordinary projection mode of the second embodiment. Within the first embodiment, the partition plate 50 is interposed between the reflector retaining side wall 67S. However, within the second embodiment, the protruding part 51 of the partition plate 50-1 prevents the partition plate 50-1 from being installed between the two walls of the reflector retaining side wall 67S.

FIG. 18B is an enlarged cross-sectional view around the partition plate 50-1. As illustrated in FIG. 18, the rails 69 protrude from inner surfaces of the casing outer wall 68. The partition plate 50-1 including the protruding part 51 is slidable in the direction of the gravitational force while being interposed between the rail 69 and the reflector retaining side wall 67S1.

When the projector apparatus 1 is set for the ordinary projection mode, the partition plate 50-1 moves downward in the direction of the gravitational force (the downward direction in FIG. 18A) so as to close the flow path 62b. Further, the protruding part 51 and the bifurcation part prevent the cooling air from flowing into the flow path 62B.

In this state, the cooling air introduced from the air intake port 61 into the light source housing 60-1 passes through the flow path 62a without entering into the flow path 62b from the bifurcation part and is introduced from the communication port 63a into the light source lamp 30. The cooling air introduced into the light source lamp 30 moves downward along the inner surface of the reflector 31 and cools the upper side of the light emission tube 32. The cooling air heated while cooling the light emission tube 32 is exhausted outside the light source lamp 30 from the air outtake port 64.

At this time, although the cooling air is introduced inside the flow path 62b after passing through the communication port 63b, the partition plate 50 prevents a back flow from occurring. Because the cooling air collides with the partition plate 50-1 in a direction perpendicular to the slide direction of the partition plate 50-1, even if the air flow rate of the cooling air increases, the partition plate 50 does not slide so as to open the flow path 62b. Therefore, the cooling air does not flow back.

FIGS. 19A and 19B illustrate the air flow in the light source housing 60-1 in the projection mode of suspending from a ceiling of the second embodiment. When the projector apparatus 1 is set for the projection mode of suspending from the ceiling, the partition plate 50-1 moves downward in the direction of the gravitational force (the downward direction in FIGS. 19A and 19B) so as to close the flow path 62a. Further, in the projection mode of suspending from the ceiling, the protruding part 51 prevents the cooling air from being introduced into the flow path 62a at the bifurcation part.

With this, the cooling air introduced from the air intake port 61 into the light source housing 60-1 passes through the flow path 62b without entering into the flow path 62a from the bifurcation part and is introduced from the communication port 63b into the light source lamp 30. The cooling air introduced into the light source lamp 30 moves downward along the inner surface of the reflector 31 and cools the upper side of the light emission tube 32. The cooling air heated while cooling the light emission tube 32 is exhausted outside the light source lamp 30 from the air outtake port 64.

At this time, although the cooling air is introduced inside the flow path 62a after passing through the communication port 63a, the partition plate 50-1 prevents a back flow from occurring. Because the cooling air collides with the partition plate 50-1 in the direction perpendicular to the slide direction of the partition plate 50-1, even if the air flow rate of the cooling air increases, the partition plate 50 does not slide so as to open the flow path 62a. Therefore, the cooling air does not flow back.

As described, within the second embodiment, the flow path 62a or 62b can be closed with an enhanced sealing capability to prevent the cooling air from being introduced into the flow path on the lower side.

Then, the upper side of the light emission tube 32 is effectively cooled and an excessive cooling of the lower side of the light emission tube 32 is prevented. Accordingly, it becomes hard to cause a temperature difference between the upper side and the lower side of the light emission tube 32.

Modified Example of Second Embodiment

FIGS. 20A and 20B illustrate the air flow in a light source housing 60-2 in the ordinary projection mode of a modified example of the second embodiment. In this modified example, a slant is formed in the protruding part 51-2 of the partition plate 50-2. In either posture illustrated in FIGS. 20A and 20B or FIGS. 21A and 21B, when a tip end of a protruding part 51-2 closes an entrance of the flow paths 62a or 62b, which exists on the lower side, the protruding part 51-2 is arranged so as to contact the lower end of the air intake port 61.

The slant of the protruding part 51-2 smoothly introduces the cooling air introduced from the air intake port 61 toward the flow path 62a without entering into the flow path 62b from the bifurcation part. The partition plate 50-2 having the protrusion 51-2, in which the slant is provided, is structured so as to be slidable by engaging with the rail 69 like the protrusions 51 and 51-1 as illustrated in the cross-sectional view of FIG. 18B.

FIGS. 21A and 21B illustrate the air flow in the light source housing 60-1 in the projection mode of suspending from the ceiling of the modified example of the second embodiment. The slant of the protruding part 51-2 smoothly guides the cooling air introduced from the air intake port 61 toward the flow path 62b without entering into the flow path 62a from the bifurcation part.

Third Embodiment

FIGS. 22A and 22B illustrate the air flow in a light source housing 60-3 in the ordinary projection mode of a third embodiment. Specifically, FIG. 22A is a cross-sectional view of the light source housing 60-3 taken along the line A-A and viewed against the projection direction of the light source lamp 30. FIG. 22B is a cross-sectional view of the light source housing 60-3 taken along the line B-B and viewed in a direction orthogonal to the projection direction of the light source lamp 30.

Within the third embodiment, recesses (grooves) 65a and 65b are formed on an inner ceiling or an inner bottom surface of a casing outer wall 68-3 so as to inward dent at positions engaging with the partition plate 50-3.

When the projector apparatus 1 is set in the ordinary projection mode, the partition plate 50-3 moves downward in the direction of the gravitational force by its own weight so that the lower end of the partition plate 50-3 engages the recess on the recess 65b on the bottom surface inside a casing outer wall 68C to close the flow path 62b. A sealing capability is enhanced in closing the flow path 62b using the partition plate 50-3 by the existence of the recess 65b. Thus, a leak of the cooling air between the inner surface (the inner bottom surface of the casing outer wall 68) of the flow path 62b and the partition plate 50-3 is prevented.

FIGS. 23A and 23B illustrate the air flow in the light source housing 60-3 corresponding to FIGS. 22A and 22B in the projection mode of suspending from the ceiling of the third embodiment.

The partition plate 50-3 moves downward in the direction of the gravitational force by its own weight, and the lower end of the partition plate 50-3 engages with the recess on the inner bottom surface of the casing outer wall 68-3 so as to close the flow path 62a. With this, a sealing capability is enhanced in closing the flow path 62a using the partition plate 50-3 by the existence of the recess 65a. Thus, a leak of the cooling air between the inner surface (the inner bottom surface of the casing outer wall 68) of the flow path 62*a* and the partition plate 50-3 is prevented.

As described, in the light source housing 60-3 of the third embodiment, the flow path 62*a* or 62*b* can be closed with the enhanced sealing capability both in the ordinary projection posture and the projection posture of suspending from the ceiling. Further, the air direction plate (the partition plate 50-3) does not move by the force of the cooling air and a flow of the cooling air can be stabilized.

Fourth Embodiment

Figure 24A:
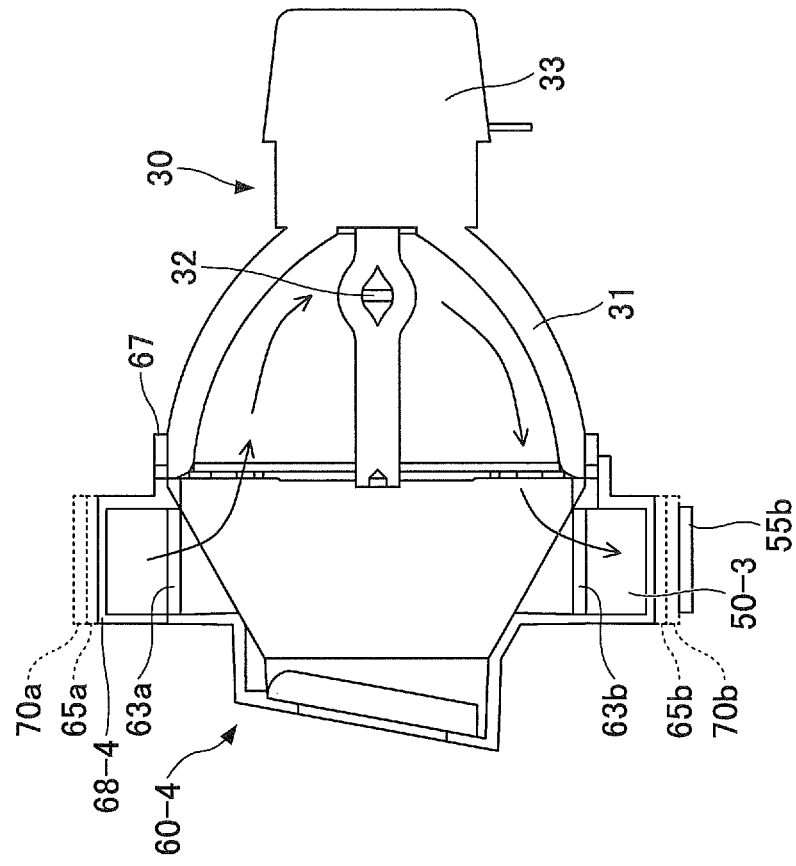
FIG. 24A is a cross-sectional view of the light source housing illustrated in FIG. 13 taken along the line A-A and viewed in a projection direction of the light source lamp in the ordinary projection mode according to a fourth embodiment of the present invention.
Figure 24B:
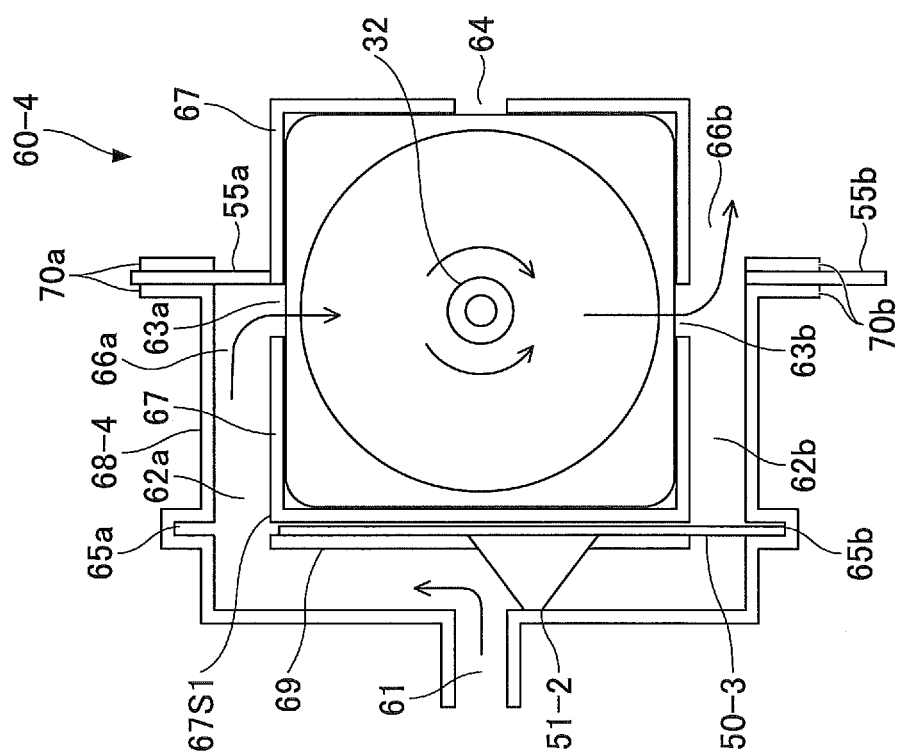
FIG. 24B is a cross-sectional view of the light source housing illustrated in FIG. 13 taken along the line B-B and viewed in a direction orthogonal to the projection direction of the light source housing illustrated in FIG. 24A.

FIGS. 24A and 24B illustrate the air flow in a light source housing 60-4 in the ordinary projection mode of a fourth embodiment. Specifically, FIG. 24A is a cross-sectional view of the light source housing 60-4 taken along a line A-A and viewed against the projection direction of the light source lamp 30. Specifically, FIG. 24B is a cross-sectional view of the light source housing 60-4 taken along the line B-B and viewed in the direction orthogonal to the projection direction of the light source lamp 30.

Within the fourth embodiment, a casing outer wall 68-4 is formed such that ends of the flow paths 62*a* and 62*b* in the vicinity of the communication ports 63*a* and 63*b* are end openings 66*a* and 66*b*, respectively. Second partition plates 55*a* and 55*b* slidable in direction of the gravitational force by these own weights are provided so as to open and close the end openings 66*a* and 66*b*, respectively. The second partition plates 55*a* and 55*b* are held so as to be slidable by second partition plate retaining parts 70*a* and 70*b* arranged in the end openings 66*a* and 66*b*.

Figure 25A:
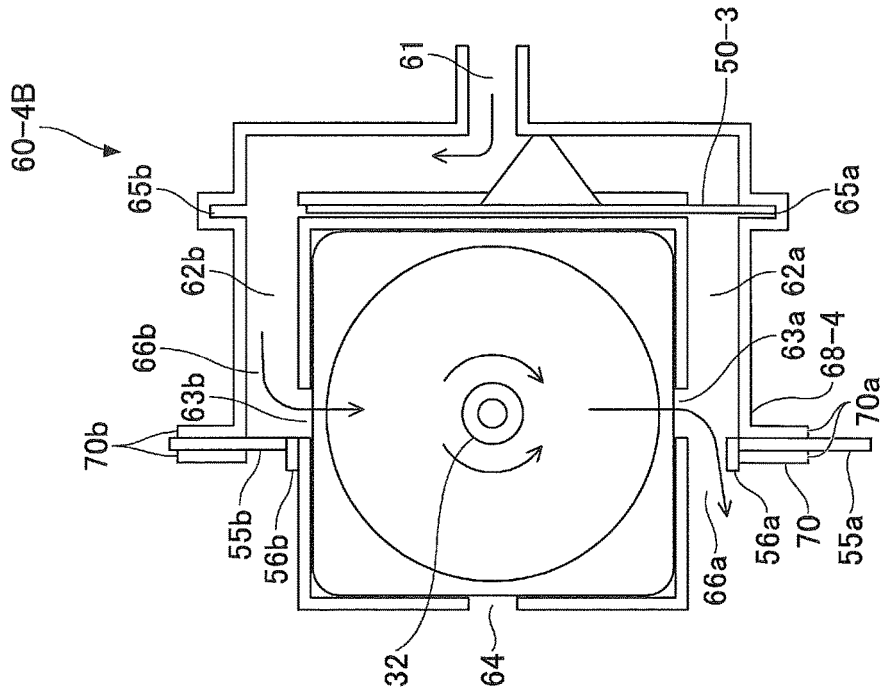
FIG. 25A illustrates an exemplary structure of a second partition plate retaining part.
Figure 25B:
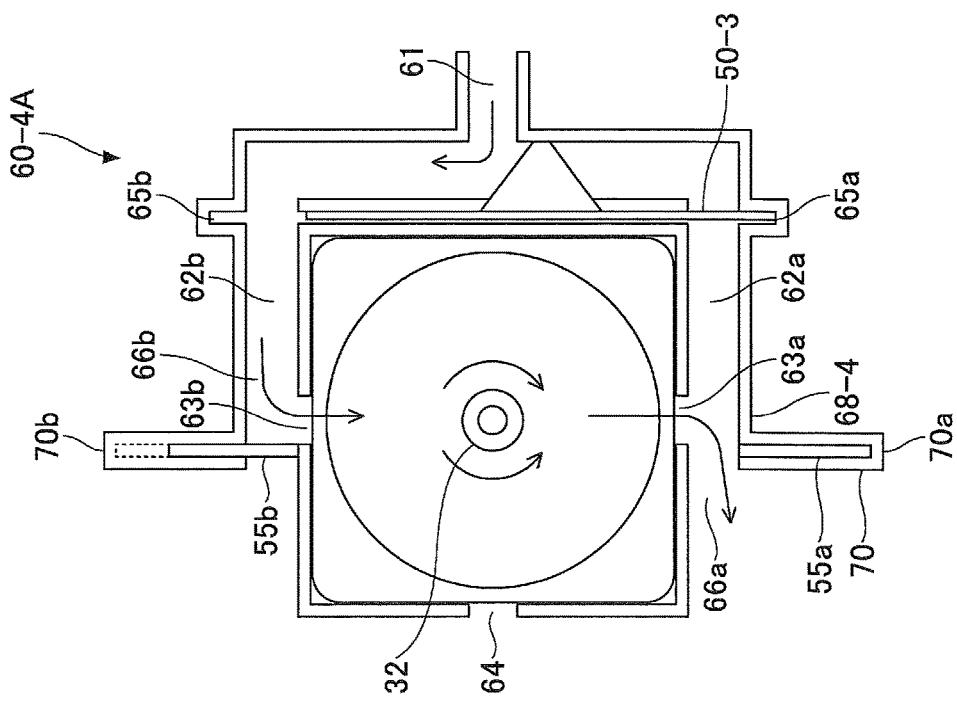
FIG. 25B illustrates another exemplary structure of the second partition plate retaining part.

FIGS. 25A and 25B illustrate structures including the second partition plate in the light source housings 60-4A and 60-4B in the projection mode of suspending from the ceiling of the fourth embodiment of the present, respectively.

An end part 70 of the casing outer wall 68-4, positioned in the vicinity of the end openings 66*a* and 66*b*, is in a cylindrical shape as illustrated in FIG. 25A so that a sliding motion of the second partition plate 55*a* and 55*b* can be stopped. Referring to FIG. 26B, protrusions 56*a* and 56*b* may be respectively provided in the partition plates 55*a* and 55*b* on sides far from the casing outer wall so that the protrusions 56*a* and 56*b* of the partition plates 55*a* and 55*b* are stopped by the second partition plate retaining parts 70*a* and 70*b*.

Alternatively, the second partition plate retaining parts 70*a* and 70*b* illustrated in FIGS. 24A and 24B may be formed to have open ends toward the outside. By arranging the light source housing 60-4 so as to closely contact another structural object inside the projector apparatus 1, the second partition plate may stop by contacting the other structural object.

Within the fourth embodiment, when the projector apparatus 1 is set for the ordinary projection mode, a partition plate 50-3 moves downward in the direction of the gravitational force (the downward direction in FIGS. 25A and 25B) so as to close the flow path 62*b*.

At this time, an end opening 66*a* of the flow path 62*a* is closed by the partition plate 55*a* and an end opening 66*b* of the flow path 62*b* is opened by the partition plate 55*b*.

Therefore, the cooling air introduced into the light source lamp 30 from the communication port 63*a* is introduced from the communication port 63*b* into the flow path 62*b*, and is exhausted from the opening 66*b*, which is opened by the second partition plate 55*b*. Because the communication port 63*b* is positioned opposite to the communication port 63*a* interposing the light emission tube 32, the cooling air introduced inside the light source lamp 30 from the communication port 63*a* can be exhausted from the communication port 63*b* without interruption. In comparison with a case where the cooling air is exhausted from only the air outtake port 64 as an opening, cooling becomes more efficient. The air outtake port 64 may not be closed to enhance a cooling efficiency.

FIGS. 26A and 26B illustrate the air flow in the light source housing 60-4 corresponding to FIGS. 24A and 24B in the ordinary projection mode of the fourth embodiment.

When the projector apparatus 1 is set for the ordinary projection mode, the partition plate 50-4 moves downward in the direction of the gravitational force (the downward direction in FIGS. 26A and 26B) so as to close the flow path 62*b*. Further, the second partition plate 55*a* closes the flow path 62*a*. Further, the second partition plate 55*b* opens the flow path 62*b*.

Therefore, the cooling air introduced into the light source lamp 30 from the communication port 63*a* is introduced from the communication port 63*b* into the flow path 62*b*, and is exhausted from the opening 66*b*, which is opened by the second partition plate 55*b*. Because the communication port 63*b* is positioned opposite to the communication port 63*a* interposing the light emission tube 32, the cooling air introduced inside the light source lamp 30 from the communication port 63*a* can be exhausted from the communication port 63*b* without interruption. In comparison with a case where the cooling air is exhausted from only the air outtake port 64 as the opening, cooling becomes more efficient. The air outtake port 64 may not be closed to enhance the cooling efficiency.

As described above, in any one of the ordinary projection posture and the projection posture of suspending from the ceiling in the light source housing 60-4 of the fourth embodiment, by exhausting the cooling air introduced inside the light source lamp 30 without interruption, the cooling efficiency can be improved.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although a light source housing has been described in detail, it should be understood that various changes, substitutions, and alterations could be made thereto without departing from the spirit and scope of the invention.

This application is based upon and claims the benefit of priority of the prior Japanese Patent Application No. 2014-037503, filed on Feb. 27, 2014, the entire contents of which are incorporated herein by reference.

What is claimed is:

1. A light source housing to which a light source lamp having a light emission tube and a reflector is attached, the light source housing comprising:
   a pair of flow paths bifurcating onto upper and lower sides of the light emission tube from an air intake port for introducing a cooling air;
   a flow path open and close unit including a plate that slides in a direction of the gravitational force so as to open the flow path on the upper side of the light emission tube and close the flow path on the lower side of the light emission tube, said direction of the gravitational force being perpendicular to the flow path and the plate being arranged so that a surface of the plate being parallel to the gravitational force so that the direction of the gravitational force is parallel to the surface of the plate; and an air outtake port that outtakes the cooling air introduced into the reflector from the flow path on the upper side of the light emission tube to an outside of the reflector.

2. The light source housing according to claim 1, wherein the flow paths are formed between a reflector retaining part being formed like a box and surrounding and retaining the reflector and an outer wall of a light source housing, wherein the reflector retaining part includes communication ports opening the flow paths on the upper and lower sides of the light emission tube and a side wall without the communication port and the air outtake port; and wherein the flow path open and close unit is a plate-like member and when the flow path open and close unit slides on and along the side wall, the flow path on the upper side of the light emission tube is opened and the flow path on the lower side of the light emission tube is closed.

3. The light source housing according to claim 2, wherein recesses are formed at portions existing inside the outer wall and contacting the flow path open and close unit when the flow path open and close unit slides, wherein the recess is engaged with a lower end of the flow path open and close unit when the flow path open and close unit slides onto the lower side.

4. The light source housing according to claim 2, wherein the flow paths extend in a direction orthogonal to the direction of the gravitational force, wherein a height of the flow path open and close unit in the direction of the gravitational force is a sum of a height of the side wall of the reflector retaining part and a height of either one of the flow path in the direction of the gravitational force.

5. The light source housing according to claim 2, wherein the side wall is arranged in the direction perpendicular to the flow path.

6. The light source housing according to claim 1, wherein a protruding part is provided in the flow path open and close unit, wherein the protruding part closes the flow path on the lower side of the light emission tube at a bifurcation part when the flow path open and close unit slides in the direction of the gravitational force.

7. The light source housing according to claim 6, wherein the protruding part provided in the flow path open and close unit has slants respectively corresponding to the flow paths so that the slants guide the cooling air.

8. The light source housing according to claim 6, wherein a tip end of the protruding part of the flow path open and close unit is arranged at a position in contact with a lower end of the air intake port when the flow path on the lower side of the light emission tube is closed.

9. The light source housing according to claim 1, wherein the reflector retaining part includes
    communication ports for opening the flow paths on the upper and lower sides of the light emission tube, respectively, and
    a pair of second flow path open and close units that open and close end openings respectively opening the flow paths in the vicinity of the communication ports, wherein when one of the second flow path open and close units closes the end opening of the flow path on the upper side of the light emission tube, another one of the second flow path open and close units opens the end opening of the flow path on the lower side of the light emission tube so as to exhaust an air introduced into the reflector through the flow path on the upper side of the light emission tube through the flow path on the lower side of the light emission tube and the corresponding end opening.

10. A light source device comprising:

a light source lamp including a light emission tube and a reflector; and the light source housing according to claim 1, to which the light source lamp is attached.

11. An image projection apparatus comprising:

the light source device according to claim 10; and a cooling fan that is connected to the light source housing and sends an air to the light source lamp.

* * * * *